(12) United States Patent
Morley

(10) Patent No.: US 7,591,513 B2
(45) Date of Patent: Sep. 22, 2009

(54) CHAINLESS GATE SYSTEM

(76) Inventor: Mitchell Stanley Morley, 19545 South S.R. 525, Freeland, WA (US) 98249

( * ) Notice: Subject to any disclaimer, the term of this patent is extended or adjusted under 35 U.S.C. 154(b) by 510 days.

(21) Appl. No.: 11/401,297

(22) Filed: Apr. 11, 2006

(65) Prior Publication Data

US 2006/0232121 A1    Oct. 19, 2006

Related U.S. Application Data

(60) Provisional application No. 60/671,236, filed on Apr. 13, 2005.

(51) Int. Cl.
*B60P 1/267* (2006.01)
(52) U.S. Cl. .................... 298/23 MD; 298/23 S
(58) Field of Classification Search ............ 298/23 MD, 298/23 S, 23 A, 23 D; 296/51, 56
See application file for complete search history.

(56) References Cited

U.S. PATENT DOCUMENTS

| | | | |
|---|---|---|---|
| 2,557,082 A | 6/1951 | Double | |
| 2,691,244 A | 10/1954 | Steinke | |
| 2,842,397 A | 7/1958 | Fleming | |
| RE25,702 E | 12/1964 | DeBiasi | |
| 4,068,892 A | 1/1978 | Welch | |
| 4,141,591 A | 2/1979 | Spicer | |
| 4,723,817 A | 2/1988 | Wallan | |
| 4,951,999 A | 8/1990 | Rudolph et al. | |
| 5,143,496 A | 9/1992 | Smith et al. | |
| 5,288,137 A * | 2/1994 | Henry | 298/23 DF |
| 5,407,251 A | 4/1995 | Ritchie, II | |
| 5,823,630 A | 10/1998 | Graham | |
| 6,170,916 B1 | 1/2001 | Lawson | |
| 6,217,123 B1 | 4/2001 | Palmberg, Jr. | |
| 6,302,491 B1 | 10/2001 | Anderson | |
| 6,499,808 B2 | 12/2002 | Palmberg, Jr. | |

* cited by examiner

*Primary Examiner*—Stephen Gordon
(74) *Attorney, Agent, or Firm*—Buchanan Ingersoll & Rooney PC

(57) ABSTRACT

A system for controlling a dump truck's tailgate opening may be used when dumping materials out in piles or spreading. The system has a mechanically controlled device that can be mounted to a conventional dump box. A connecting arm is attached to a tailgate which interconnects with a control unit mounted on the dump box. The control unit is configured to catch the tailgate as it falls from a closed position due to the force of gravity. The system allows an operator to select, from within the truck's cab, one or more opening positions for the tailgate.

31 Claims, 18 Drawing Sheets

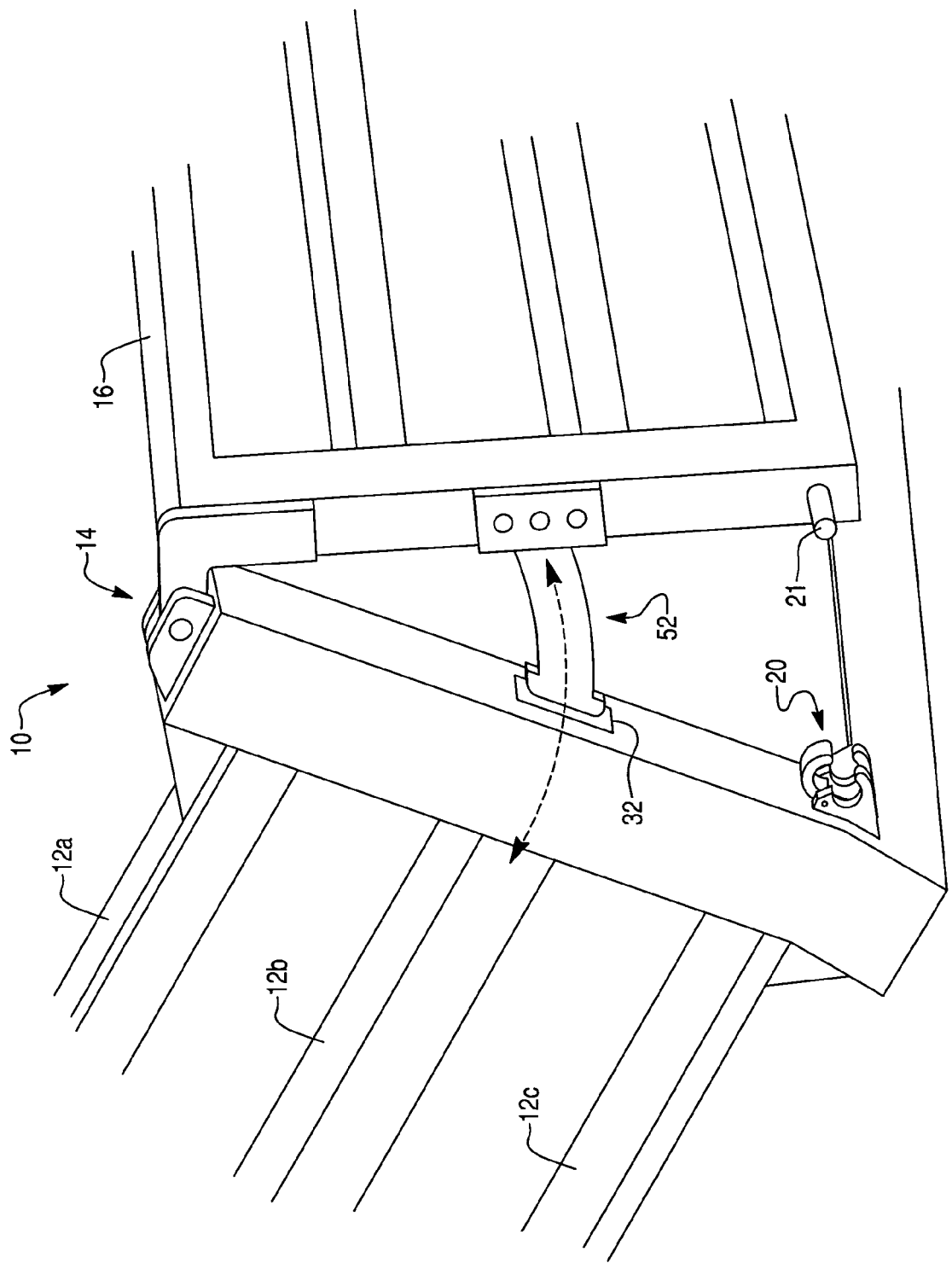

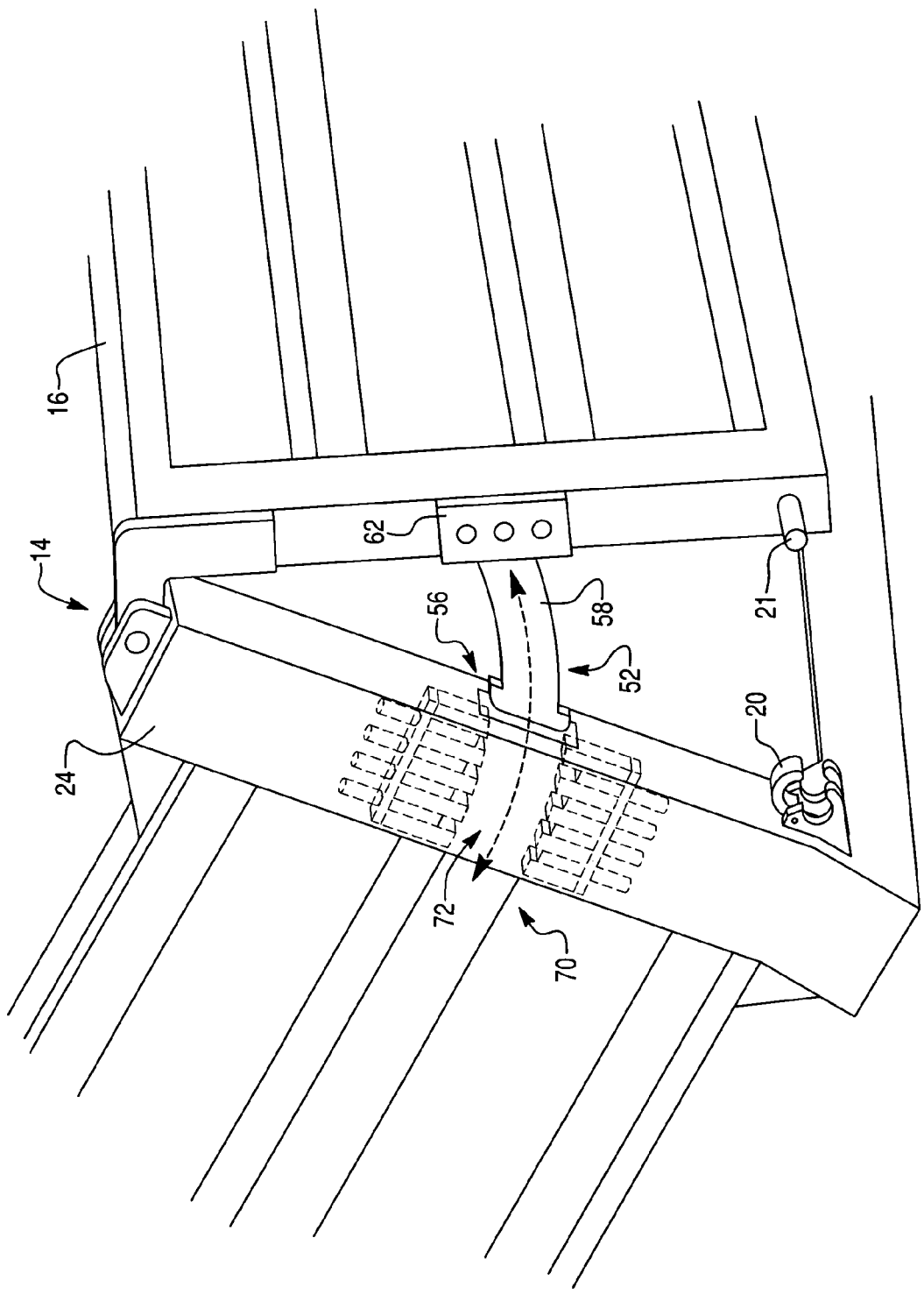

CHAINLESS GATE SYSTEM

CROSS REFERENCE OF RELATED APPLICATION

This application claims priority to U.S. Provisional Patent Application Ser. No. 60/671,236, filed Apr. 13, 2005.

FIELD OF INVENTION

This invention relates to dump trucks used in the construction industry, and more specifically to tailgates of dump trucks and dump trailers.

BACKGROUND OF INVENTION

A conventional dump vehicle has a frame mounted on wheels with a driver's cab, and a dump box that can hold a volume of material that is transported to a location and dumped. A hydraulic lifting system on the dump vehicle pivots the dump box with respect to the frame to an angle where the loaded material can freely slide out of the rear end of the dump box. This type of dump box has a front wall and cab guard, two sidewalls with a tailgate pivotally mounted to a rear upper end portion of the dump box. A latching device is provided near the bottom edge of the tailgate. The latch is used to hold the tailgate closed so that the loaded material will not fall out during transit.

Dump trucks haul various materials into and out of construction projects for building pads, parking lots, road structures, etc. Some of the time, these trucks stockpile the loaded material in piles by releasing the tailgate latch and raising the dump box to an angle where the material freely sides out through the tailgate opening and onto the ground. Other times these trucks are required to spread the loaded material out evenly as the truck is in motion so as to provide an even discharge of material over a desired area. To enable the truck for this material spreading, a driver will usually stop the truck, get out of the cab and manually set a pair of spreader chains on the rear end of the dump box. One end of each of the chains are most often found welded to the back end of the dump box frame, and the other end is attached to the tailgate by hand in a connecting slot that is provided on the tailgate. The truck driver selects a certain length of chain and attaches it to each side of the tailgate. The driver then returns to the cab with the tailgate latch still closed. The dump box is then raised to about a 40 degree angle above the truck frame. The truck is then set in motion, the tailgate latch is released, and the (pre-set) spreader chains stop outward movement of the tailgate so as to cause metered material to exit. The chains are set to cause the dump box to release an exact depth and flow rate of material. Different chain length settings allow the material to be spread out at different thickness as needed. It should also be noted that dump trucks are often used to haul materials in both directions, i.e., two and from a worksite. Indeed, there are times when there is as much or more waste material leaving a job site then that which comes in. This means that drivers are required to set chains when arriving at the site, e.g., to spread refined products, and then to remove the chains when leaving so that the waste material can be dumped from the truck bed. This is an inconvenience, loss of time, and puts the driver outside the safety of the truck and in harms way.

A spreader system sets an opening by essentially dropping the tailgate from an inclined dump box until it is suddenly restrained by the spreader chains. The resulting jolt or impulse force felt by both the tailgate and dump box provides a beneficial effect. It tends to break up packed down material and thus promotes metered flow from the dump box at the moment when the truck begins moving. But each time a dump truck driver is required to make adjustments to the tailgate opening, or when changing from spreading material to dumping material out in a pile, the driver must stop the truck, get out, and manually reset or un-set the spreader chains. Nevertheless, spreader chains are still widely used today because they are believed to work well—an even spread of loaded material can be achieved using chains.

Two other systems for spreading or dumping material have been proposed. They are described in U.S. Pat. No. 6,499,808 to Palmberg and U.S. Pat. No. 6,302,491 to Anderson, respectively Palmberg discloses a dump vehicle with a tailgate that is pivotally mounted adjacent to the rear opening of a bed. The tailgate has a closed position in which a gate blocks the rear opening to prevent discharge from the bed through the rear opening. The vehicle further includes a gate control mechanism connected to the gate. The gate control mechanism selectively raises the gate from a closed position to a first position using a hydraulic cylinder, allowing metered discharge of material, or to a second position that allows the gate to fully pivot so as to allow unmetered discharge of material. Palmberg's device may be operated with chains or with the gate control mechanism. When the gate control mechanism is used, the tailgate can be selectively raised to a desired height by causing the tailgate to travel linearly along channels formed on the bed. Additionally, Palmberg's system appears to operate by a hand-eye system when finding the correct opening for metered flow.

Anderson discloses a control system for controlling the opening and closing of the tailgate of a dump truck including an actuator unit, which is mounted on the truck box or tailgate. The actuator unit controls the degree of opening of the tailgate during an unloading operation and therefore the rate at which the material is discharged from the truck box. A positional feed back unit produces an output signal indicating the movement of the tailgate between open and closed positions. This signal is displayed on a control panel of a control unit in the truck cab. An operator in the truck can control the opening and closing of the tailgate and can monitor the position of the tailgate. The control system is said to effect an accurate metering of material from the truck box.

Anderson's device does not have a separate latch to keep the tailgate closed during transit. Instead, the proposed system for metered flow also closes the tailgate. Thus, in Anderson's system, a hydraulic system controls both the flow metering as well as the latching or unlatching of the tailgate. Also, Anderson's system uses a pair of double acting hydraulic systems to raise and lower the tailgate.

It would be desirable to have a system that retains all of the benefits of a chain system while removing the less desirable qualities of such a system for dumping material; it would also be desirable to have a reliable system for dropping metered flow, without an increased cost in man hours associated with assuring proper dumping and/or spreading of material; it would also be desirable if a system were available that did not require extensive retrofitting to existing trucks or significant changes to design; it would also be desirable if a system were available which did not place a driver in harms way when resetting a gate; and/or it would be desirable if a system were provided which offered a fail-safe mode which allowed the truck to be used even if there is a loss of power in a tailgate opening mechanism.

SUMMARY OF INVENTION

These and other needs are met by the invention. In one embodiment, an apparatus for metered pouring of material from a truck includes a dump box where a first latch is engaged with a lower end of a tailgate. A second latch includes at least a first member and a second member, a selector device having a first and second selection, and a coupling between the selector device and the second latch such that when the first selection is selected, the first member is engaged and when the second selection is selected, the second member is engaged. In this embodiment, when the first latch is released and the first selection is selected, the tailgate rotates to a first open position and is held in the first open position by the first member, and when the first latch is released and the second selection is selected, the tailgate rotates to a second open position and is held in the second open position by the second member. Preferably, the apparatus is configured to catch the tailgate and the first and second members using air cylinders. The first member may be a pin, finger or hook. And the tailgate may include an extension arm that has a surface that can abut the first member. The tailgate may include an arm and this arm can be formed to abut the first member.

In another embodiment, a method for pouring material includes the steps of lifting a dump box into an inclined position, selecting one of a plurality of selectable gate opening positions, where the one opening position is suitable for pouring material from the dump box, remotely activating a stopping member that corresponds to the one opening position, and after the gate is released, letting the gate freely fall about the wall until it reaches the one opening position. The gate is held at the one opening position by the activated stopping member. The stopping member may correspond to a finger, pin or hook and an example of the activating a stopping member step is displacing a stopping member into the path of the tailgate as it falls from the latched position. Further, the actuating step may occur from within the cab of a dumping vehicle, such as a dump truck, and the dumping vehicle may be equipped with a hydraulic cylinder for lifting and lowering the dump box.

In another embodiment, an apparatus for controlling the movement of a tailgate includes a first latch disposed on a dump box and configured to engage a lower end of the tailgate. A second latch includes a first portion mounted on the tailgate, a second portion disposed on the dump box and defining a passage for the first portion when the tailgate rotates, a member disposed near the passage, and a control device adapted to configure the member between a first and second position, the second position corresponding to at least a portion of the member being within the passage. When the member is in the first position, the tailgate can freely rotate within a first angular range and when the member is in the second position, the tailgate can freely rotate within a second angular range, the first angular range being greater than the second angular range. The passage may be described by a channel or only a hole. Further the channel may be straight or arcuate. For example, if an arcuate channel is used, then the arm may be arcuate so as to match the curvature of the channel. Additionally, in this embodiment the first and second members may each be controlled by air cylinders. And these air cylinders may be controlled by solenoids that are connected to a selector switch.

The passage may include one or more members that are displaceable within the passage. The members may be spaced from each other in proportion to the difference in angular ranges between the opening positions defined by those respective members. Further, the tailgate may include an arm that is displaceable within the passage. It is also possible to position the arm on the dump box, rather than the tailgate, and to have only one arm located centrally on the dump box or tailgate. The arm may be formed as a multi-part linkage or merely form a pin connection between the arm and the dump box and/or tailgate. In these later embodiments, the arm may also be received in a horizontal or vertical grooved slot.

In another embodiment, a method for metered pouring of material from a dump truck includes the steps of lifting a dump box into an inclined position, the dump box having a wall, a tailgate pivotally connected to the wall and a latch engaged with the tailgate to prevent rotation of the tailgate about the wall; actuating a stopping member from within the cab; opening the latch, whereupon the tailgate falls; and catching the falling tailgate with the stopping member. In this embodiment, the actuating step may include displacing a piston arm so as to move the stopping member and the catching step may correspond to impacting the stopping member with the tailgate as it is falling.

It is an object of the invention to provide a dump truck with a tailgate system that offers the benefits of a chain system, while providing a savings in man hours and improved safety to the driver when the tailgate is reset.

It is an object of invention to provide a system for positioning a tailgate at selective opening positions using an air-pressure source.

Another object of the invention is to provide such a cab controlled tailgate system that has the capability to stop the tailgate's outward movement at a pre-selected position the instant the tailgate latch is released, and that can provide an exact material depth, at an exact point when needed.

Still another object of the present invention is to provide such a tailgate system that doesn't require the use of hydraulics, motors, gear drives, or other types of power sources to move the tailgate in, out, up or down.

Yet another object of the present invention is to provide a tailgate system that is adaptable to existing dump box designs and may be completely hidden from view.

Another object of the invention is to provide a system that can be operated using only a truck's existing air supply and 12 volt system.

Another object of the present invention is to provide a tailgate system that is durable, able to withstand everyday abuses, requires little if any maintenance, and is affordable.

These and other aspects of the present invention will become apparent to those skilled in the art after a reading of the following description of the preferred embodiment when considered with the drawings.

BRIEF DESCRIPTION OF THE DRAWINGS

FIGS. 2A and 2B are respective first side and perspective views of the dump truck of FIG. 1 including one aspect of a tailgate system according to the invention.

FIGS. 3 and 3A are respective second side and perspective views of the dump truck of FIG. 1 including other aspects of the tailgate system.

DETAILED DESCRIPTION OF EMBODIMENTS OF THE INVENTION

Figure 1:
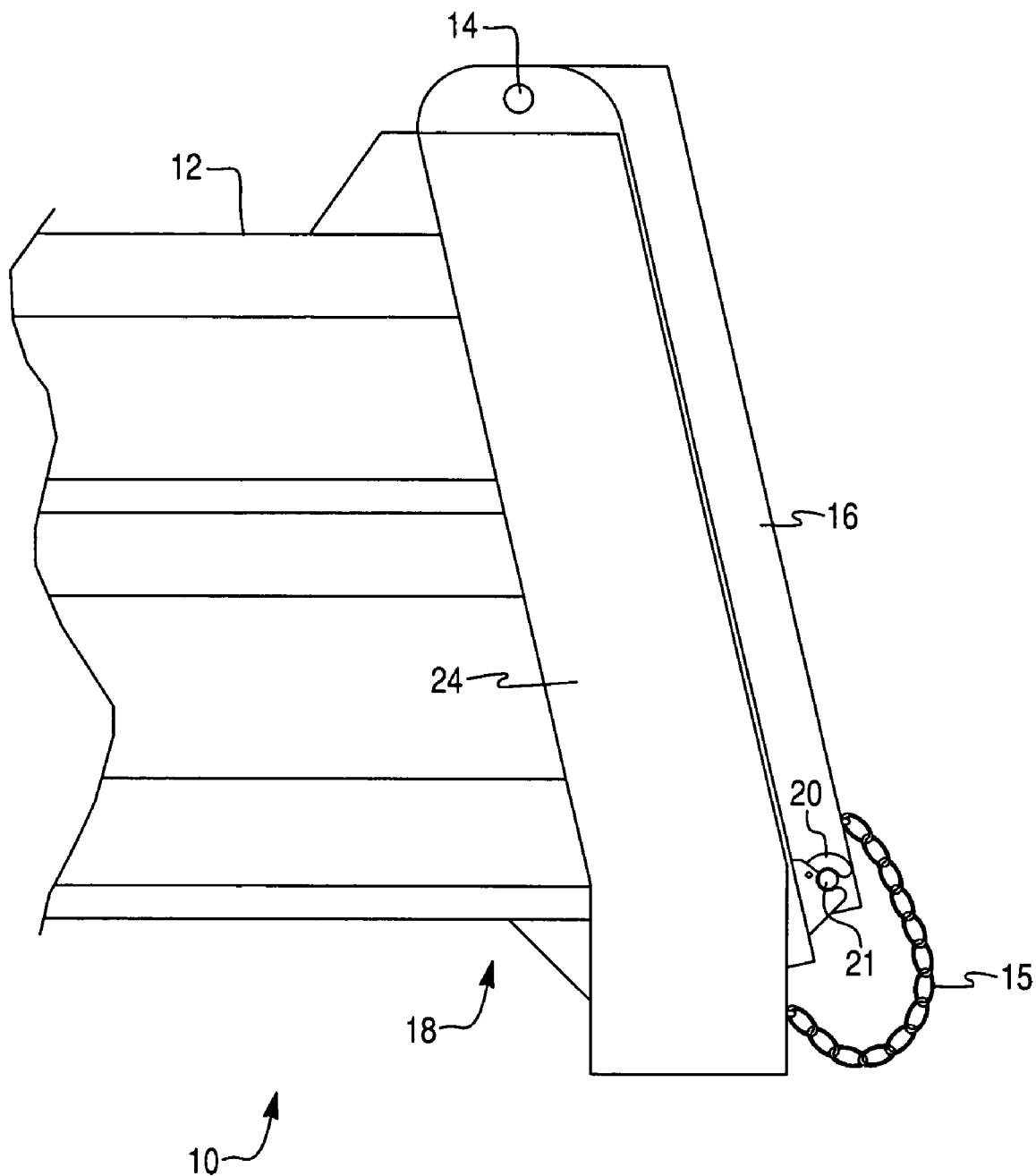
FIG. 1 is a partial side view of a rear portion of a dump truck.
Figure 2A:
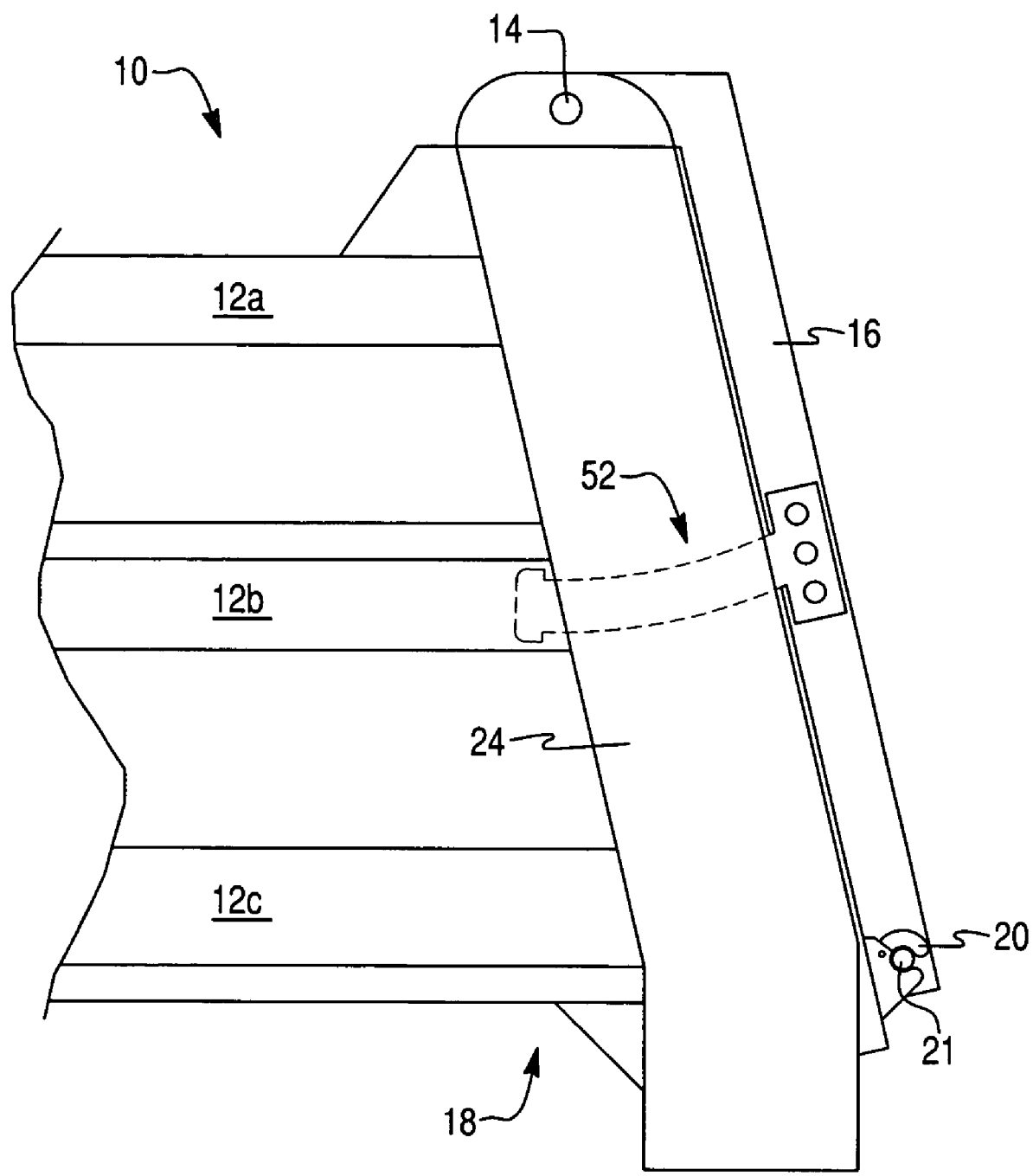

With reference to FIG. 1, a dump truck's dump box 10 includes a tailgate 16 that is mounted at the dump truck's rear end 18 at hinge 14. A sidewall 12 of dump box 10 is shown in FIG. 1. Sidewall 12 includes rectangular stiffening members, e.g., members 12a, 12b, and 12c, which add flexural rigidity to side wall 12. A frame 24 of dump box 10 is located at the rear end 18 of dump box 10. Hinge 14 is located on frame 24 and tailgate 16 rests against frame 24 when dump box 10 is closed and material retained therein, as shown in FIG. 1. It should be noted that dump box 10 is illustrated only as one example of a material container for which the invention is intended. As will become readily apparent, any dumping container which pours material from an inclined position may be configured according to the teachings of the invention.

When tailgate 16 is closed, FIG. 1, such as when the dump box 10 is moved to or from a job site, the lower end of tailgate 16 is held to frame 24 by a latch 20 which grips a post 21 located at a lower end of tailgate 16 (an additional latch 20 and post 21 may also be located on the opposite side of frame 24, and configured in the same fashion as latch 20 and post 21). Latch 20 may be moved between the closed position in FIG. 1 to an open position by a pneumatic system located beneath the dump box and mounted to the vehicle's rear frame. The air system associated with latch 20 may be a conventional air system that is present on most dump trucks. Latch 20 is operated from within the cab of the vehicle carrying dump box 10. When latch 20 is in an open position, i.e., when latch 20 is not gripping post 21, tailgate 16 moves freely about hinge 14, within a restricted angular range if spreader chains 15 are attached to tailgate 16 and within an unrestricted angular range if chains 15 are released from tailgate 16. As mentioned earlier, chains 15 may be used to meter material exiting from dump box 10.

Material, held in dump box 10, is dispensed from dump box 12 by first raising dump box 12 so that its front end is higher than its rear end 18. The angle of incline is generally about 45 degrees from horizontal. A one-way hydraulic cylinder (not shown) is conventional on most trucks for raising and lowering a dump box. When dump box 10 is inclined, the material inside presses against tailgate 16 and should exit from end 18 by gravity when tailgate 16 opens, unless the opening formed by tailgate 16 becomes blocked (this topic is discussed later). If one wants to simply dump the material into a single pile, chains 15 are not needed and thus tailgate 16 may swing freely open when latch 20 is released. However, if one wants to lay down a strip or area of material of a specific depth, then tailgate 16 may be restricted from fully opening when latch 30 is released so that the flow rate of material exiting dump box 10 can be monitored or metered. For example, if a job calls for a depth of material to be laid over a specific area, such as during road construction, then a driver would first park the truck at a starting position. Then, the driver would set chains 15 according to the depth of material to be laid and the type of material in the dump box 10. The dump box 10 is then raised. The driver then begins to move the truck and, as the truck begins to move, releases latch 20 to begin the metering of material. Tailgate 16 opens suddenly and falls due to its weight and inclination of dump box 10 until it is caught by chains 15. The metered material begins to flow out of the dump truck.

According to the following embodiments, a dump truck is fitted with a chainless tailgate system that may be activated from a dump truck's cab. The tailgate system includes structures that may be interconnected so as to instantly stop outward movement of the tailgate as it opens. The system provides the truck operator with one or more tailgate settings, for an exact depth and spot for spreading material. As will be appreciated, the chainless tailgate system of the following embodiments may be readily adapted for use with other dumping structures without departing from the scope of invention.

Figure 3:
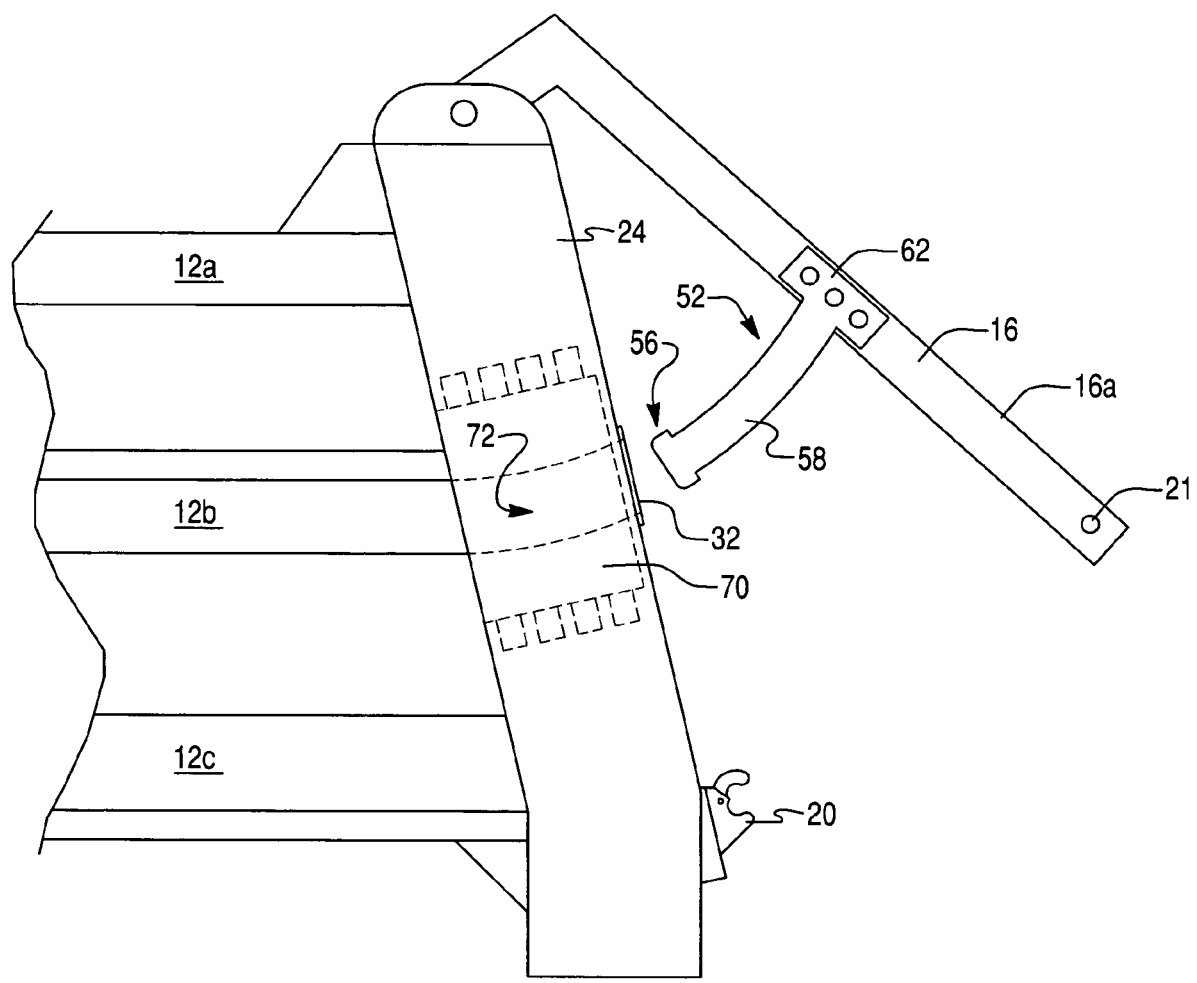
Figure 4:
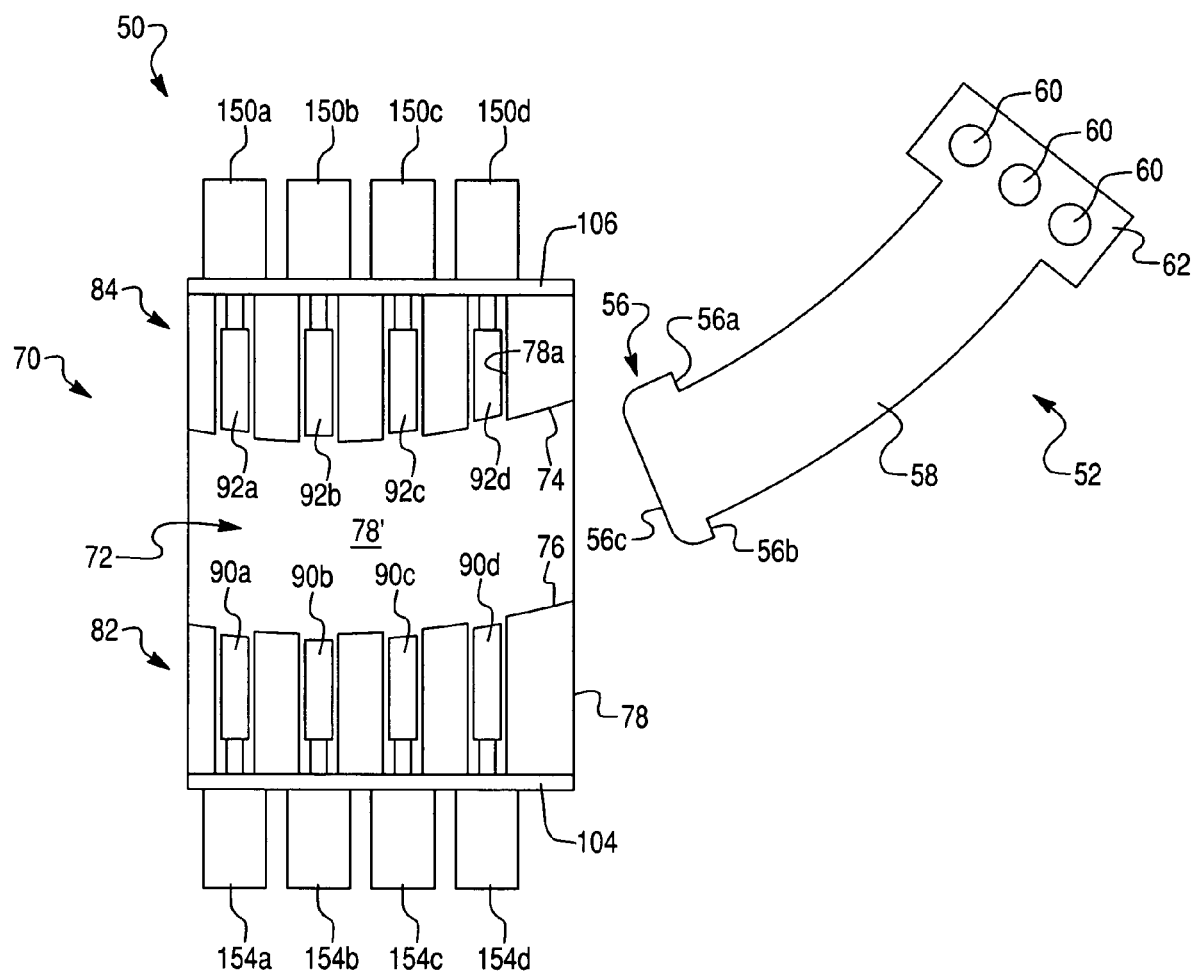
FIG. 4 is a second side view of the portion of the tailgate system of FIG. 3.

With reference to FIGS. 2, 3, 4 and 5, a dump box 10 is fitted with a latching mechanism 50, which includes a connecting arm 52 and a control unit 70. Control unit 70 and connecting arm 52 are shown in FIGS. 3 and 4. Connecting arm 52 is mounted to a side surface 16a of tailgate 16 and control unit 70 is mounted to frame 24 of dump box 10. Latching mechanism 50 may also include a second control unit and connecting arm mounted on the opposite side surface of tailgate 16 and the opposing side of frame 24. The structure and operation of this other connecting arm and control unit may be the same as control unit 70 and connecting arm 52, and may be operated simultaneously with connecting arm 52 and control unit 70 as will become apparent. Connecting arm 52 is preferably located so that control unit 70 aligns with channel 12b'. Connecting arm 52 may be placed above or below this location if desired.

Connecting arm 52 includes a flange 62 that receives bolts 60 for securing connecting arm 52 to side surface 16a. An arcuate extension 58 extends from flange 62 and terminates in an end piece 56 having a rounded leading edge 56c. An upper ledge 56a and lower ledge 56b are formed on edge piece 56. These ledges are offset from each other. Extension 58 is made from a rigid material and adapted for being received within a passageway 72 of control unit 70. Leading edge 56c is rounded to assist with guiding extension 58 into passageway 72 when connecting arm 52 is removed and then directed back into passageway 72. Passageway 72 is defined by upper and lower arcuate surfaces 74, 76, a first surface 78' formed by a finger plate 78 and a second, opposing surface 80' formed by a control unit cover plate 80. See FIGS. 9 and 9B. These surfaces define a passageway for receiving connecting arm 52 within control unit 70. As can be appreciated by reference to FIG. 3B, passageway 72 is shaped to allow free passage of arcuate extension 58 into and out of passageway 72 when tailgate 16 is closed and opened, respectively.

a. Control Unit 70 (Mechanism)

Figure 8:
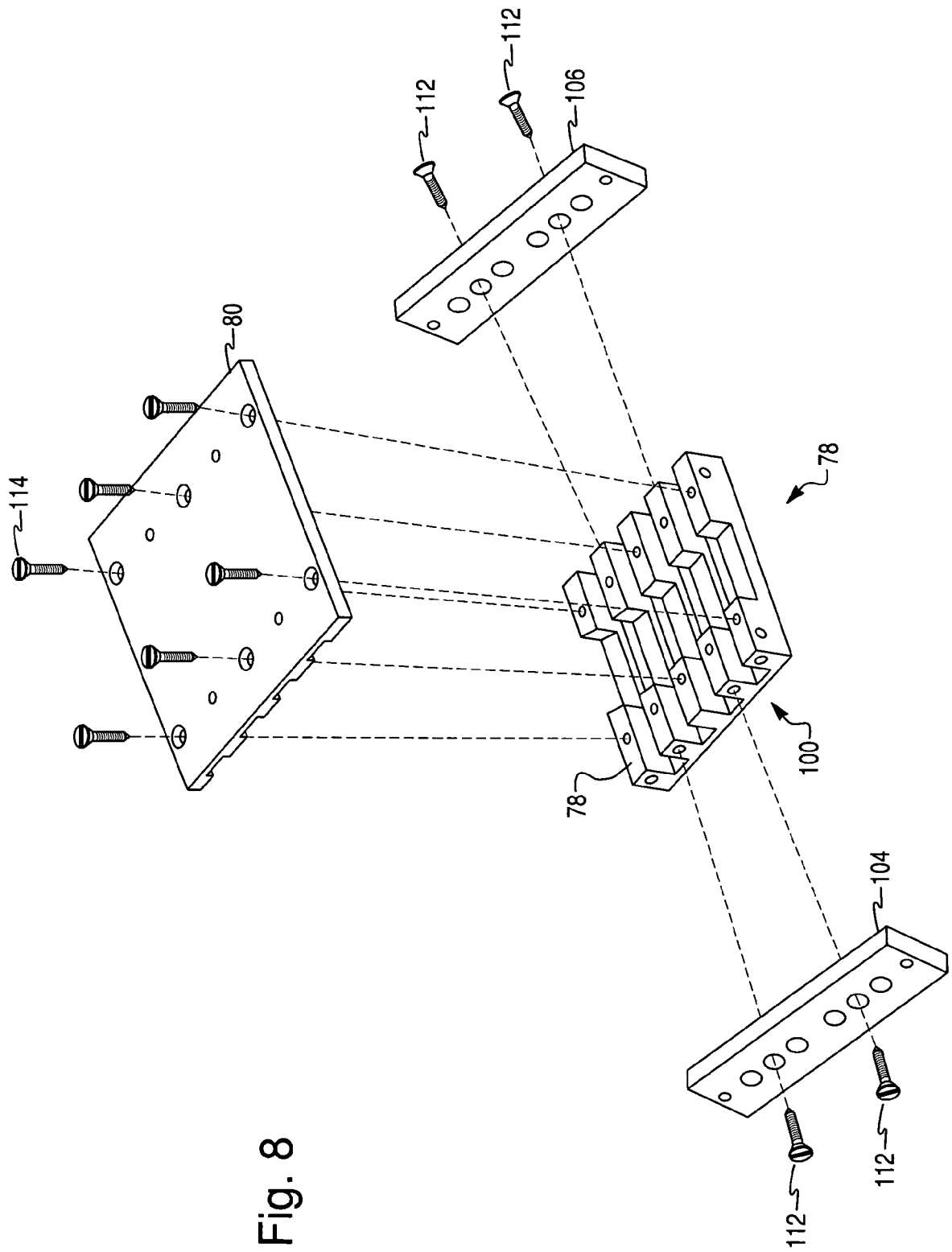
FIG. 8 is a first exploded perspective view of an assembly of a portion of a control unit of the tailgate system.
Figure 9:
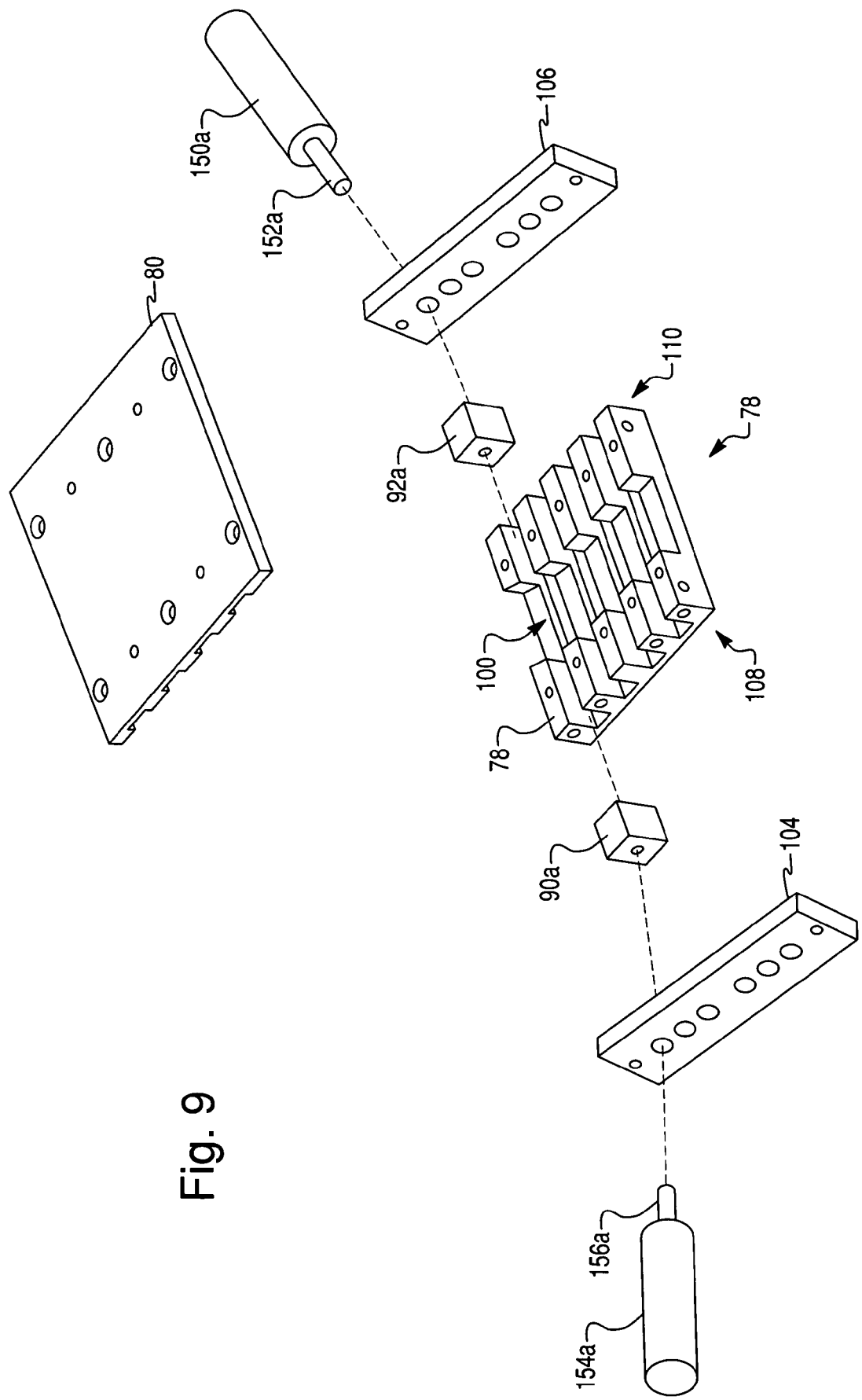
FIG. 9 is a second perspective view of an assembly of a portion of the control unit of the tailgate system.

With reference to FIGS. 4, 8 and 9, control unit 70 includes a series of eight fingers (90a-d and 92a-d) that are movable within corresponding slots formed in finger plate 78, as best seen in FIGS. 4 and 9. These fingers correspond, respectively, to eight different opening positions for tailgate 16. When a specific opening position is needed for tailgate 16, a finger corresponding to that opening position is displaced into passageway 72. This finger will block movement of connecting arm 52 within passageway 72. The resulting action of tailgate 16 and connecting arm 52 with respect to control unit 70 will now be discussed with reference to FIG. 3B.

Connecting arm 52, if not held within passageway 72 when latch 20 is released, will be pulled out of passageway 72 when dump box 10 is sufficiently inclined and tailgate 16 falls into an open position by action of gravity. Prior to releasing latch 20, tailgate 16 is against frame 24 and substantially all of extension 58 is disposed within passageway 72 (as illustrated in phantom). In a preferred embodiment, a portion of passageway 72 is provided by an open channel 12b', aligned with the portion of passageway defined by control unit 70. Open channel may be provided by a hollow stiffener 12b of side wall 12.

Figure 3B:
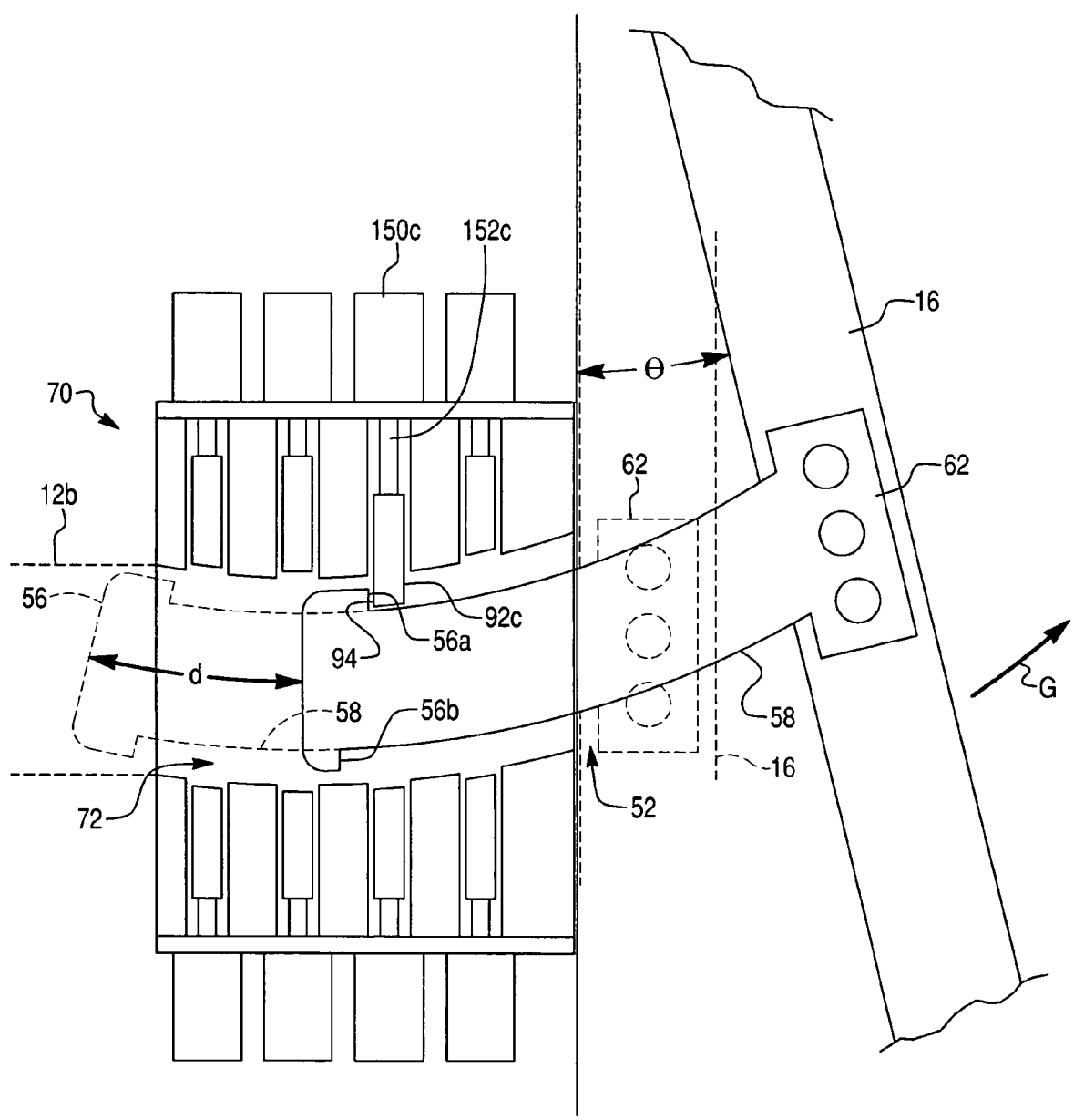
FIG. 3B is a first side view of a portion of the tailgate system.

With reference to FIG. 3B, a finger 92c is displaced into passageway 72. Finger is preferably displaced into this position by a piston arm 152c of a two-way air cylinder 150c that is in fluid communication with the dump truck's existing air supply. When latch 20 is released, tailgate falls open and connecting arm 52 (attached to tailgate 16) begins to withdrawal from passageway 72 (the radial component of the gravity force acting on tailgate 16 is depicted in FIG. 3B by force G). After extension 58 has traveled a distance d, ledge 56a impacts surface 94 of finger 92c, which prevents extension 58 from being further withdrawn from passageway 72. Tailgate 16 is now held in an opening position or opening angle θ by the surface contact between surfaces 94 and 56a, which has been found to be sufficient to resist the gravitational force G acting on tailgate 16 and any additional loading caused by material as it presses against tailgate 16.

When material will be dumped into a single pile, no fingers are displaced within passageway 72, so that connecting arm 54 can be fully removed from passageway 72. Preferably, when control unit 70 is not configured in an operating state, i.e., turned off, no fingers are extended into passageway 72. This is preferred so that tailgate 16 can be fully opened without having to actuate a finger, in the event that control unit 70 becomes inoperative. In such a situation, tailgate may be equipped with spreader chains 15 so that the dump truck may still be used to meter material in a conventional manner. Alternatively, finger 92a may be operated to displace into passageway 72 when tailgate is closed and latch 20 activated to hold tailgate 16 shut. In this embodiment, finger 92a would operate as a zero position dead lock for added safety, i.e., to ensure that tailgate 16 remains closed in the event latch 20 fails.

a. Control Unit 70 (Fingers)

Finger 92c location along passageway 72 corresponds to a desired opening angle θ for metered flow of material from the dump box 10. Referring to FIG. 4, the other seven fingers, 90a, 90b, 90c and 90d (located along a lower portion 82 of finger plate 78) and 92a, 92b, 92c and 92d (located along an upper portion 84 of finger plate 78) correspond to different opening angles (or positions) of tailgate 16 for metered flow of material from the dump box 10. For example, finger 92b would be displaced into passageway 72 when a smaller opening angle is desired and finger 92d would be displaced into passageway 72 when a larger opening angle is desired. Hence, fingers 92a, 92b, 92c and 92d correspond respectively to increasing opening angles (or positions) for tailgate 16. Fingers 90a-d are arranged opposite to fingers 92a-d. Fingers 90a-d are used to select a different range of angles, which can be appreciated by inspection of the relative positions of ledges 56a and 56b on extension 58. Returning to the example illustrated in FIG. 3B, if finger 90c were displaced (rather than 92c), connecting arm would be held in place when ledge 56b impacted the surface of finger 90c. Since ledge 56b is more forward on extension 58, tailgate 16 will rotate to a more open position than that represented by angle θ in FIG. 3B. Hence, according to this embodiment, control unit 70 is configured to provide eight different opening positions for tailgate 16. Each of these opening positions provide a different, restricted angular range of movement for tailgate 16, e.g., the angular range of 0 to θ when finger 92c is selected. Four of these opening positions are selected by displacement of one of fingers 90a-d and the other four positions are selected by displacement of one of fingers 92a-d. Alternatively, eight (or more) opening positions may be provided in the following manner. Ledges 56a and 56b may be located at the same distance from edge 56c, while lower fingers 90a, 90b, 90c and 90d are positioned so as to not align with fingers 92a, 92b, 92c and 92d, respectively.

As will be appreciated, the tailgate system may be used to hold a tailgate open when maintenance is needed inside the dump box, such as to clean or repair walls of the dump box. The system could be operated as follows. Dump box is raised and the latch 20 released. The tailgate 16 is now fully open. Before lowering dump box 10, a finger is extended into passageway 72. Then, when dump box 10 is lowered, the passage for extension 58 will be blocked by the finger extended into passageway 72. Thus, tailgate 16 is held in an open position.

Figure 9B:
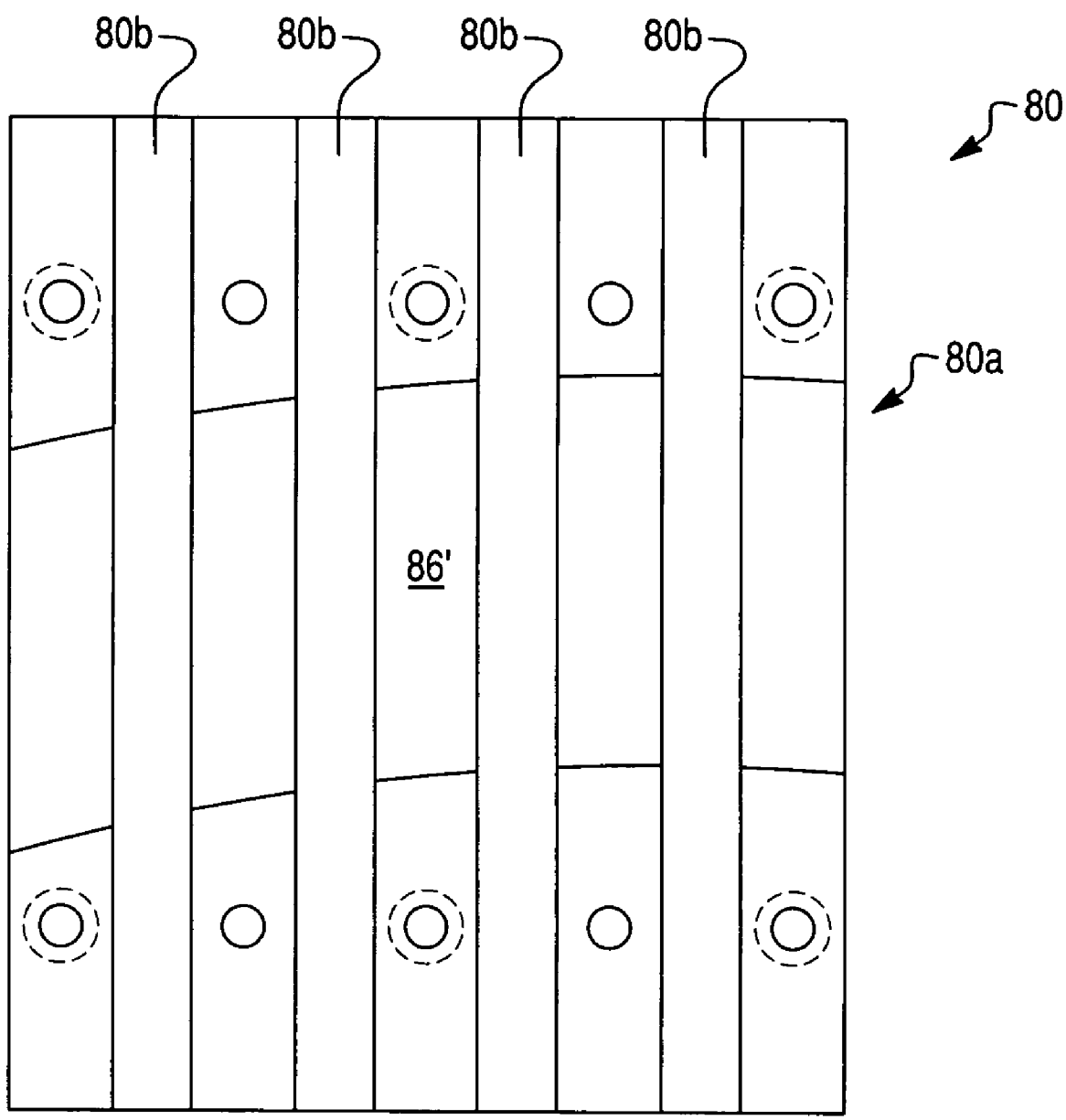
FIG. 9B is a side view of a portion of the control unit of the tailgate system.

FIGS. 8 and 9 are exploded views of an assembly of finger plate 78, plates 104 and 106, and cover plate 80. Finger plate 78 is constructed from one piece of rigid material, such as hardened stainless steel. Four slots 100 are formed, e.g., by precision machining, in finger plate 78 for shuttle movement of the respective fingers 90a-d and 92a-d into and out of passageway 72. The portion of passageway 72 defined by finger plate 78 is formed by machine milling a radius curve suitable for allowing extension 58 to pass freely through passageway 72. Similarly, extension 58 of connecting arm 54 is made from rigid material and machined to a designed radius that matches the center area radius of finger plate 78. A cover plate 80 is secured to finger plate 78 by fasteners 114. As shown in FIG. 9B, on the side facing finger plate 78, a radius 80a and four slots 80b are precision machined to match the radius and slots 100 formed on finger plate 78.

Fingers 90a-d and 92a-d are each made of a rigid material and machined to fit in a designated slot 100, respectively. Each finger has a designed radius cut that matches the inside radius of finger plate 78. Plates 106, 104 are mounted at upper and lower ends of finger plate 78 and secured thereto by four fasteners 112. Plates 104, 106 each include four holes for passage of piston arms associated with air cylinders 154a-d and 152a-d which are used to actuate fingers 90a-d and 92a-d. Two of these air cylinders 150a, 154a and their piston arms 152a, 156a are illustrated in FIG. 9. FIG. 4 shows all eight air cylinders 154a-d and 152a-d with their respective piston arms connected to fingers 92a-d and 90a-d. Preferably, piston arms provide a one-inch travel. As will be appreciated, fingers 90a-d, 92a-d, extension 58 and air cylinders 154a-d and 152a-d can vary in size, shape, and material, and even the radius can be changed as long as the control unit 70 and extension 58 have matching radii, e.g., if connecting arm 54 is moved further up or down along tailgate 16. Additionally, the fingers may be actuated by other means than air cylinders. For example, fingers may be actuated by a roller cam assembly or a cable system. And the two-way air cylinders may be replaced with a single acting air cylinder having a return spring.

Figure 5:
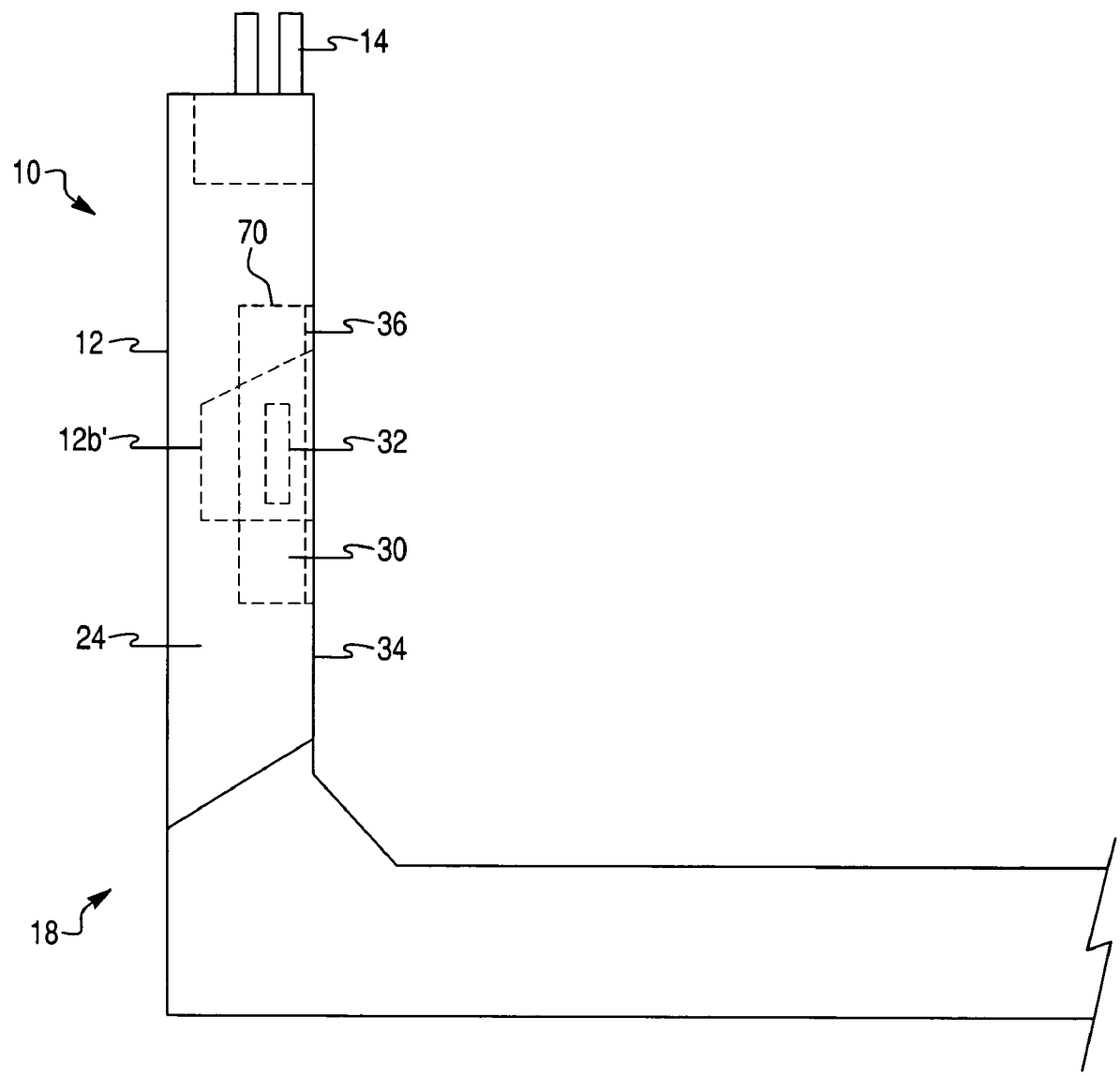
FIG. 5 is a rear view portion of the dump box of FIG. 3 incorporating the tailgate system.

With reference to FIGS. 3 and 5, a preferred mounting arrangement for control unit 70 will now be described. FIG. 5 is a view of the back end 18 of dump box 10, with tailgate 16 removed and only the left side shown. A cutout is made on the inside surface 34 of side wall 12. Control unit 70 is inserted into the space provided by the cut-out and mounted to frame 24 by a suitable fastening. An access plate 36 is placed over the cut-out. Access plate 36 provides installation and maintenance access for control unit 70. An access hole 32, cut and beveled on the back of frame 24, allows connecting arm 52 to enter and exit from passageway 72. In order to avoid buildup of foreign material within passageway 72, access hole 32 may include a scraping surface, e.g., an elastic piece, located around its perimeter, which can remove any loose material that may collect on extension 58 before it enters passageway 72. Access plate 36 is a flush mount plate with counter sunk bolts. Access plate 36 may be located on either side of the control unit 70. As illustrated, control unit 70 is preferably positioned to align with a channel 12b' formed by a hollow stiffening member of wall 12. Channel 12b' provides a portion of passageway 72 in this embodiment.

Figure 6:
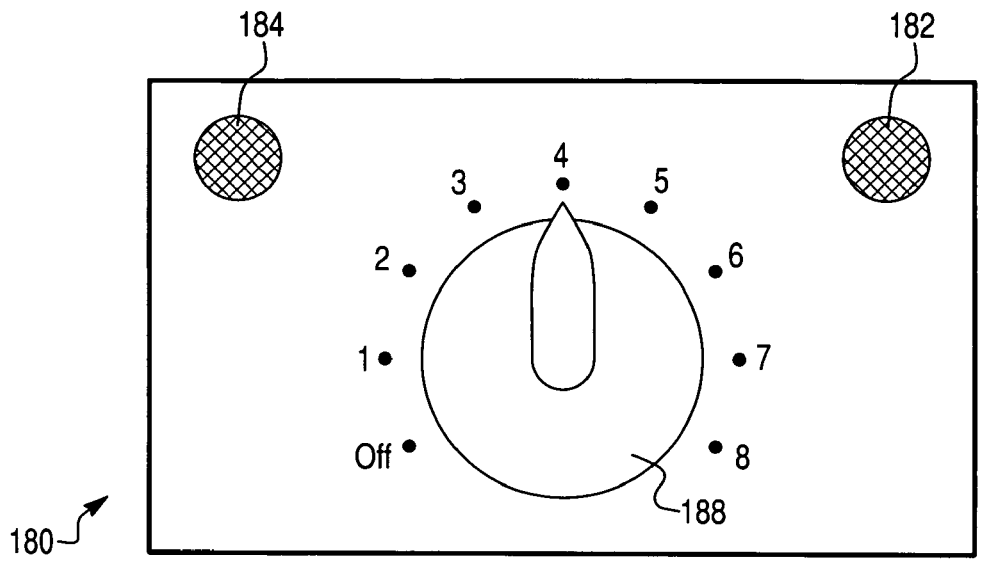
FIG. 6 is a system selector portion of the tailgate system.
Figure 7:
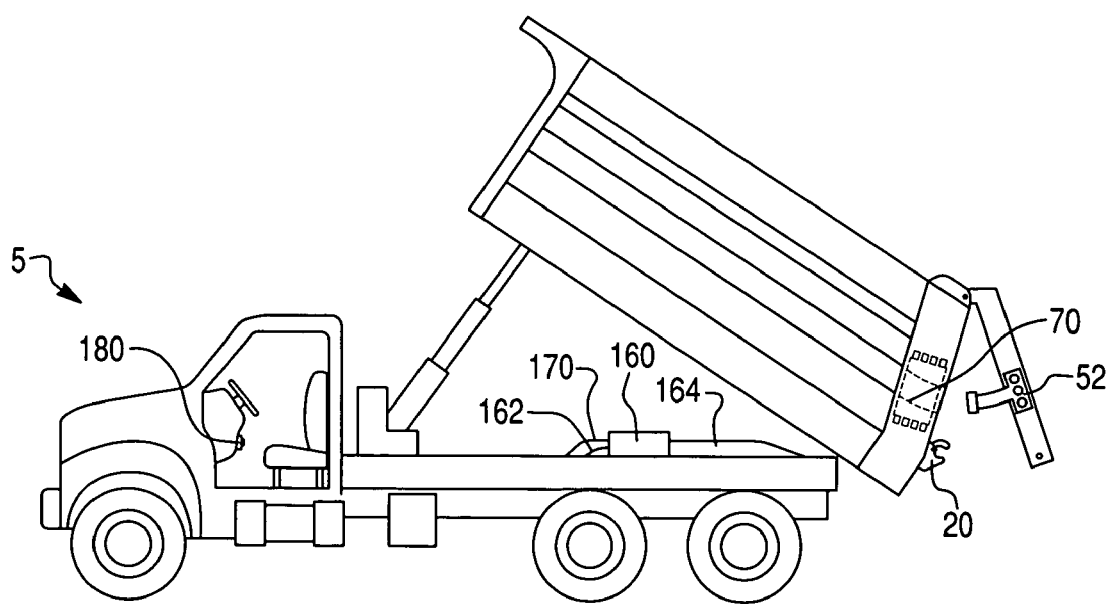
FIG. 7 is a side view of a dump truck incorporating the tailgate system.
Figure 7A:
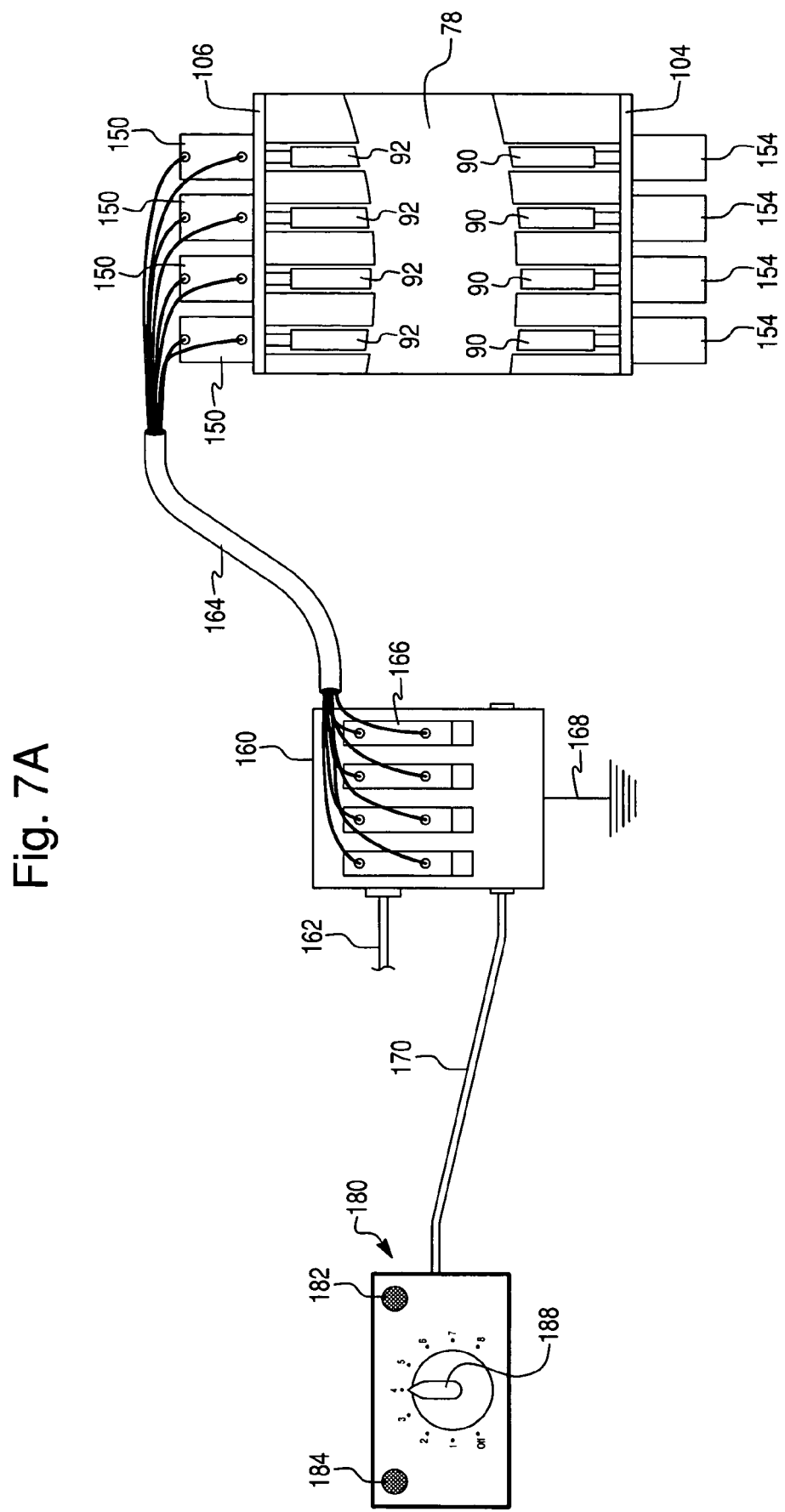
FIG. 7A is a side view of a control system portion of the tailgate system.

As indicated earlier, fingers 90a-d and 92a-d are displaced by two-way air cylinders. Referring to FIGS. 6 and 7, there is shown a preferred tailgate system for a dump truck 5. Referring to FIG. 7A, an airline 164 contains an input and output line that is connected, at one end, to each of air cylinders 150 and, at the other end, to a corresponding set of air solenoids 166 which are mounted in a solenoid housing 160 (a same set of input/output lines are connected to cylinders 154 at one end and solenoids at the other end, not shown). Housing 160 is located on the undercarriage of truck 5. Each of solenoids 166 are electrically connected to a system selector 180 mounted within the cab of truck 5. Solenoids 166 are powered by the truck's 12 volt battery. The ground wire 168 for air solenoids 166 is attached to the frame of truck 5. An air supply line 162 connects air solenoids 166 to an air supply that, in this case, also supplies air pressure for latch 20.

With reference to FIG. 6, system selector 180 includes a hand dial 188 that may be turned to eight different positions corresponding to the eight finger positions 90 and 92, and an off position which shuts down control unit 70. A green activation light 182 is illuminated as a position is selected and goes out when hand dial 188 is turned to the off position. A red light 184 is illuminated when a finger is locked in position. Red light 184 is turned off when a position has been unlocked and released. The system selector 180 may be configured to have a delay between positions, e.g., a one second delay, so that as the dial 188 is moved to a different position, i.e., from position 2 to 4, an unwanted intermediate position, position 3, is not activated. The timing delay can be modified to fit specific needs, as well as the type of selector 186.

Accordingly, a preferred embodiment of the invention is configured to operate a tailgate without requiring a power source to move the tailgate. The tailgate system relies on gravity to move the tailgate, not an external power supply. Further, any power requirements for this system may be easily met by the dump truck's existing systems, e.g., a 12 volt battery and air system for operating latch 20. Thus, embodiments of the invention provides a tailgate system that can provide several opening positions for the tailgate using a pressurized air source and/or without the requirement that the tailgate be held in intermediate positions using, e.g., a hydraulic system.

In operation, as a dump truck enters a job site loaded with material, the driver is directed to a location where he or she is required to either dump the loaded material in a pile, or spread it out evenly over the ground. When dumping a load out in a pile, the driver backs up to a directed spot and engages the vehicle's hydraulic system, which inclines the dump box. In this application, system selector 180 is kept in the off position. After the dump box has reached the desired angle of inclination, the operator opens latch 20, and the loaded material slides down through tailgate 16 and empties onto the ground. The truck is pulled ahead just enough to allow any remaining material to slide out onto the pile. The dump box is then lowered and the tailgate closed with latch 20.

When the driver is directed to spread material out evenly at a desired depth, dial 188 is turned to an appropriate setting for spreading the material. When a setting is selected, a finger of the control unit 70 is displaced into passageway 72. After the finger is locked, as indicated by red light 184, the driver engages the vehicle's hydraulic system while latch 20 remains in the closed position, holding tailgate 16 against frame 24. The driver raises dump box 10 to about a 45 degree angle above the truck's frame. The driver then starts moving the truck forward. At a designated spot, the driver releases latch 20, thereby opening tailgate 16. As tailgate 16 falls (due to its own weight), connecting arm 52 impacts the finger that extends into passageway 72, instantly stopping extension 58 and thus the outward movement of tailgate 16 at the selected setting. This event may also be understood as follows. When latch 20 is released, an extended finger or hook, e.g., hook 92c, catches the falling tailgate 16.

It should be noted that when a dump trucks box is raised to a 40 degree angle or greater, the weight of gravity acting upon tailgate 16 is significant, even with no material in the dump box. This gravitational force causes the tailgate to instantly open when the tailgate latch is released. When the dump box is loaded, gravity along with the pressure of the loaded material against tailgate 16, creates additional forces acting upon tailgate 16. As a result, there is a great deal of force causing tailgate 16 to open when latch 20 is released. This is advantageous as it assists in causing material to flow easily at the desired metered rate. Additionally, the shock felt by the dump box and tailgate 16 as tailgate 16 opens and connecting arm 52 impacts a finger (or as the finger catches the tailgate) will help to dislodged any material that might clog the opening of tailgate 16. It has also been found that if a clog should occur, system selector 186 may be turned to the next setting, which easily widens the tailgate opening so that the clogged material can be dislodged. The tailgate system may be completely controlled from within the truck's cab, so as to avoid placing a driver in harms way, such as when a driver exits the cab to manually set chains. The tailgate system also provides a driver with the ability to move from a first opening to a second, wider opening from within the cab without having to first reset tailgate 16 to a closed position, as is the case with, e.g., a chain system.

The tailgate system may be modified according to specific design needs, user or manufacturer preferences, operational and/or space limitations without departing from the scope of invention. For example, the tailgate system could be relocated to the center of the dump box, where it could be attached to the under side of the dump box floor. This would permit one to use a control system that has a single control unit located in the center of the dump box, a single shaft that slides in and out of the control unit, and without limiting the control unit's ability to control movement of the tailgate. According to this embodiment, and in a similar fashion as the illustrated embodiments, a shaft could be connected to the tailgate when an operator needs to spread material, and could be disconnected from the tailgate to dump a pile, all controlled from the driver' cab. In another embodiment, a connecting arm may be pin-connected to the tailgate and frame of the dump box, with the pin located on the frame and configured to slide within a groove. With this arrangement, a connecting arm may be straight or curved. For example, connecting arm could be straight and slidable along a horizontal (or vertical) groove or passageway provided on or in the dump box side wall or rear frame, with hooks that are configured to catch connecting arm at locations along the passageway corresponding to tailgate opening positions.

In another embodiment, a control unit mounts to each side of the dump box, with arms that are able to slide back and forth inside the control unit, but do not completely exit from the unit. In this embodiment, a control unit and associated power and selector systems may be configured in a manner similar to those described earlier. Here, the arms connect to the tailgate for spreading, and may be disconnected for dumping. When arms are disconnected from the tailgate, they remain with the dump box. The arms may alternatively be received in slots formed in the tailgate, so that the tailgate moves relative to arms when dumping a pile or for metered flow. In this example, a setting for the control unit would permit the arms to slide outward as tailgate opens, but would come to an abrupt stop as a flange or ledge abuts a surface coupled to an actuator, e.g., a finger coupled to an air cylinder.

Figure 10:
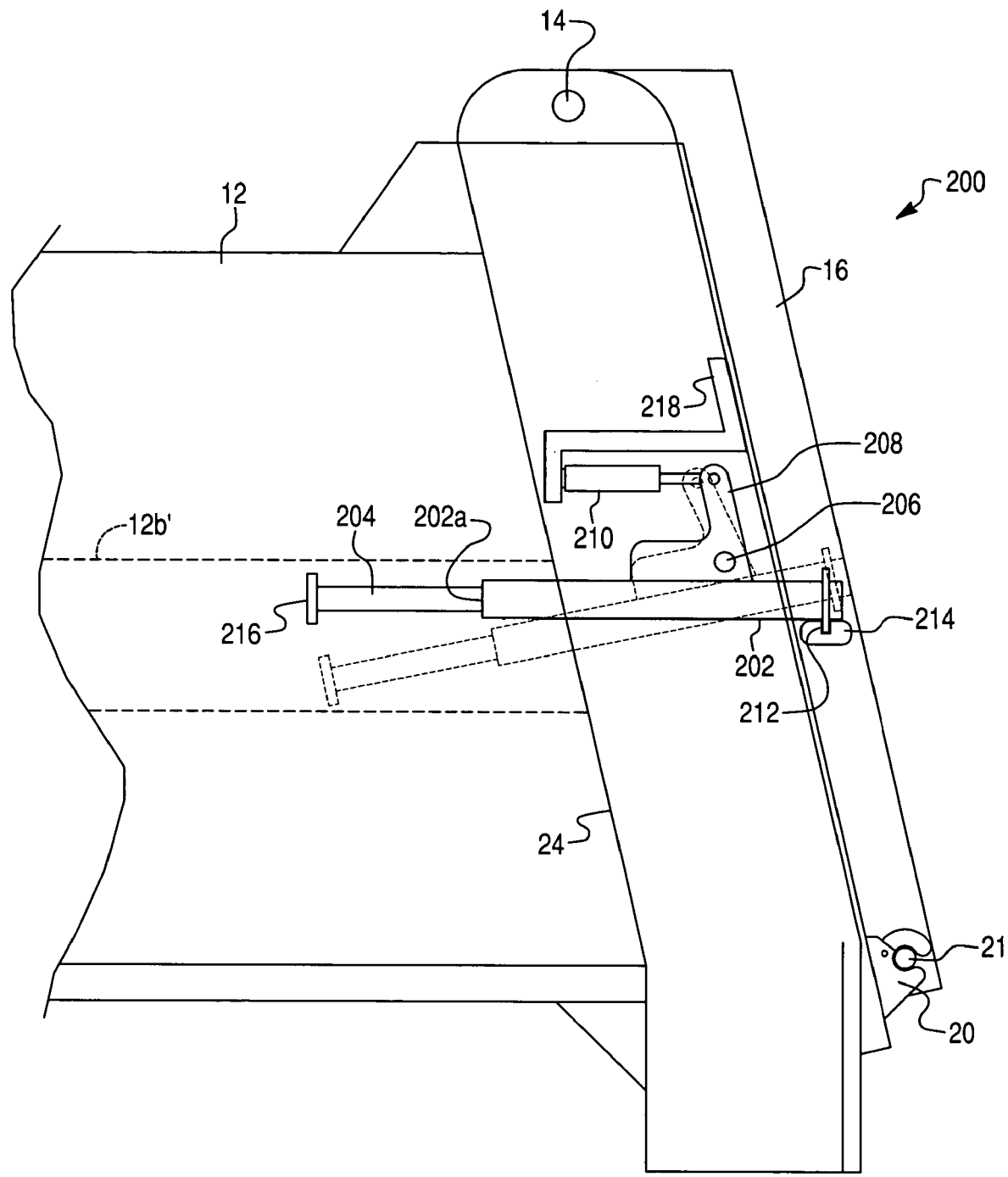
FIG. 10 is a side view of a second embodiment of a tailgate system according to the invention.

With reference to FIG. 10, a tailgate system 200 according to a second embodiment of the invention is illustrated. In this embodiment, a shaft 204 slides within a tubular control unit 202 when tailgate 16 opens. Shaft 204 motion is also accommodated within channel 12b' of frame 24. A flange 216 is provided at one end of the shaft 204 and a locking pin 212 is provided at the opposite end. Control unit 202 is pivotally mounted by a pivot member 206 to the frame 24 of the dump box. A locking sleeve 214 is mounted to tailgate 16 and adapted for receiving locking pin 212 when tailgate 16 is to be held in an opening position for metering material. When locking pin 212 is received in sleeve 214, control unit 202 and shaft 204 are horizontal and when tilted upward (as shown in phantom), pin 212 is removed from sleeve 214. Control unit 202 is moved between these two positions by an air cylinder 210 that is mounted to frame 24 by mount 218. An arm of air cylinder 210 displaces an extension 208 of control unit 202 to selectively place pin 212 within sleeve 214 or remove pin 212 from sleeve 214. In operation, tailgate is configured for the opening position for metering material by air cylinder 210 pushing on extension 208, which causes control unit 202 to rotate clockwise so that pin 212 is placed in sleeve 214 (solid lines). The dump box is then raised and latch 20 released. As tailgate 16 opens, shaft 204 slides left to right until flange 216 abuts a surface 202a of control until 202. The travel of shaft 204 from its starting position (as illustrated in FIG. 10) to an ending position is defined by the distance between flange 216 and surface 202a. This travel corresponds to the opening position of tailgate for metering material. As tailgate opens control unit 202 can rotate counterclockwise to follow the rotation of tailgate about hinge 14.

Figure 11:
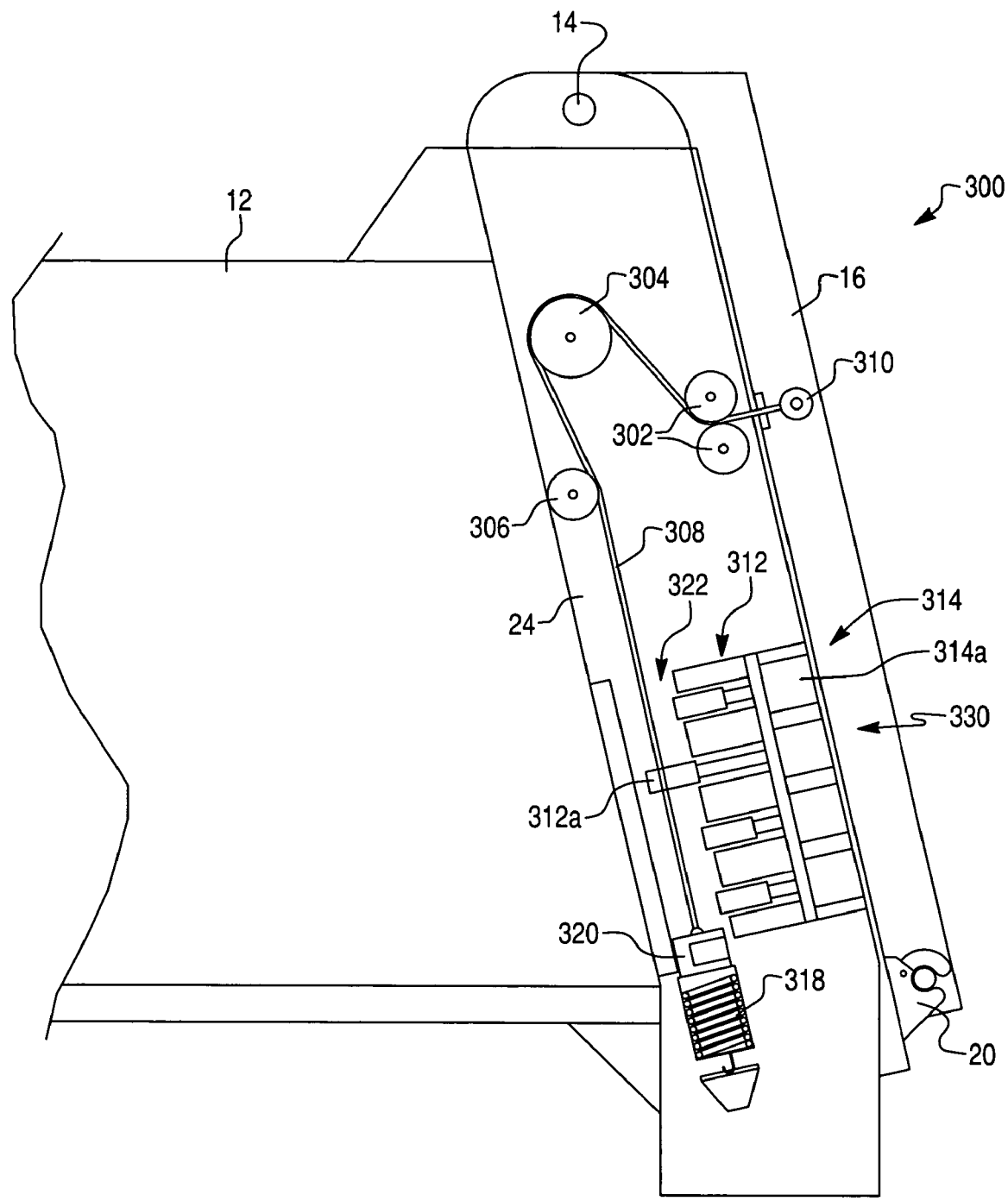
FIG. 11 is a side view of a third embodiment of a tailgate system according to the invention.

With reference to FIG. 11, a tailgate system 300 according to a third embodiment of the invention is illustrated. In this embodiment, a cable system is used to catch a falling tailgate. Cable 308 is attached, at a first end to a block 320 that slides within a channel 322. At a second end, cable 308 is secured to a bolt 310 which is affixed to tailgate 16. Guide rollers 302, 304 and 306 are provided to guide cable 308 as tailgate 16 is opened and closed. A control unit 330 is mounted to frame 24 and includes a series of movable locking pins 312 operated by a corresponding series of air cylinders 314. Pins 312 are disposed along passage 322. In this embodiment, a plurality of opening positions are available. For example, a first opening position for tailgate 16 is provided by extending pin 312a into channel 322 by air cylinder 314a so as to impact block 320 as to slides upward along channel 322 when tailgate 16 opens. When the dump box is lifted and latch 20 released, block 320 will slide upward along channel 322 until it hits pin 312a. Block 320 is now held in place and, by virtue of cable 308 being connected at its ends to block 320 and tailgate 16, tailgate 16 is held in the first opening position. A return spring 318 is attached to block 320 so that as tailgate 16 is closed, block 320 will slide back to its starting position illustrated in FIG. 11. The stiffness of spring 318, which may be fixed at one end or holding a balancing weight, may be selected according to specific needs. For example, if it is desirable to closely mimic the dynamics of a spreader chain system, a relatively soft spring (fixed at one end to frame 24) may be used.

Figure 13:
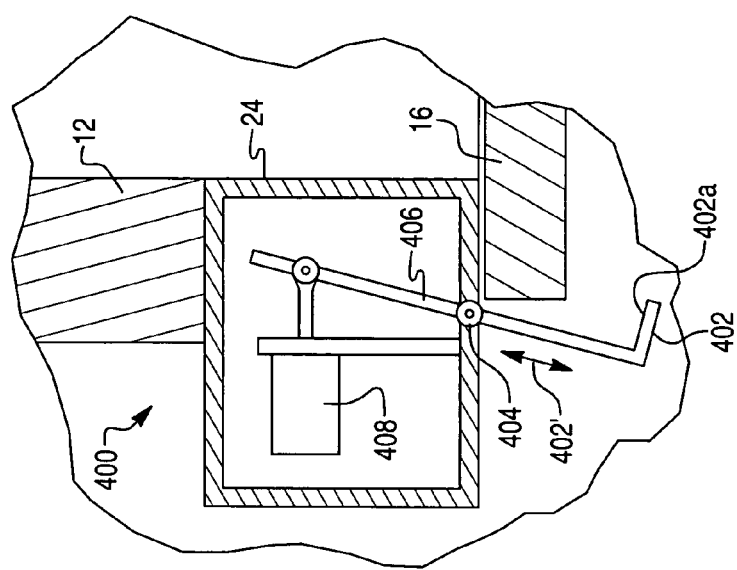
FIGS. 12 and 13 are respective side and top views of a fourth embodiment of a tailgate system according to the invention.
Figure 12:
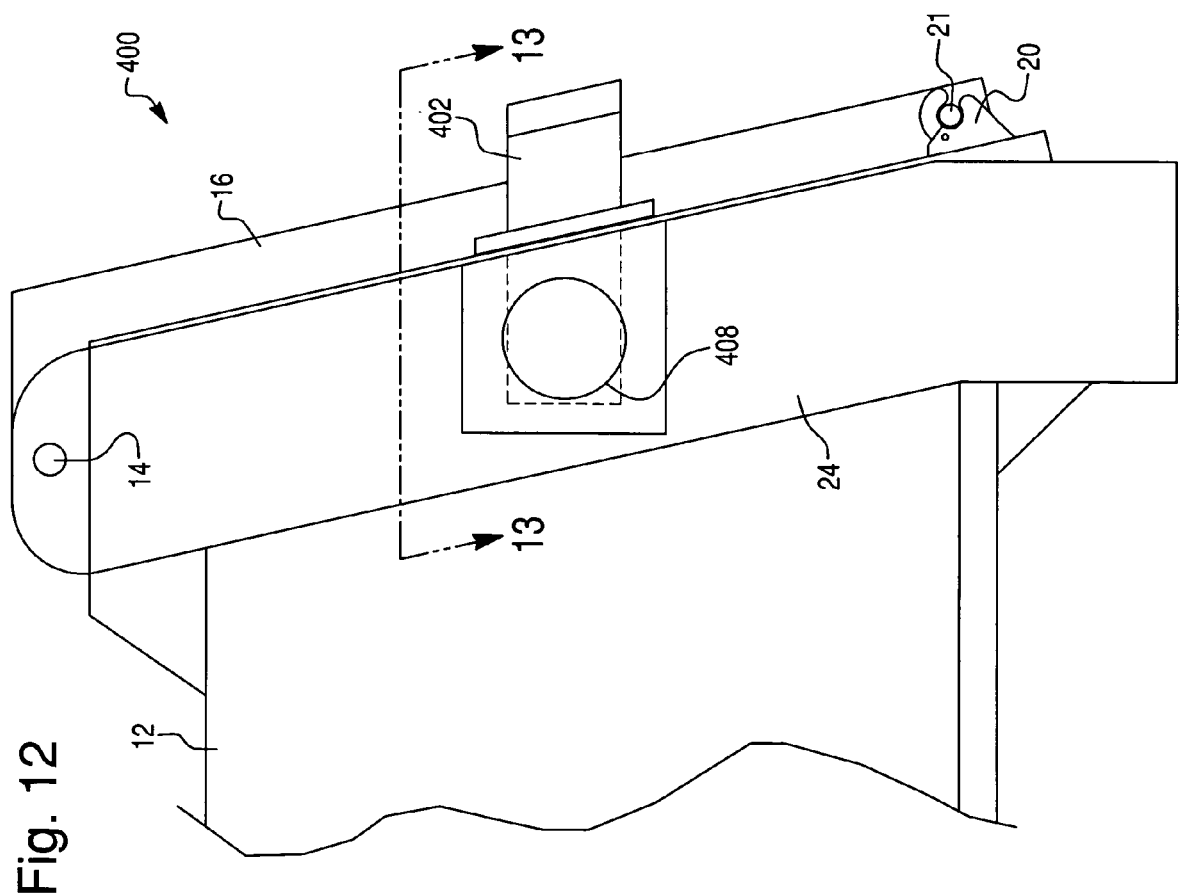

With reference to FIGS. 12 and 13, a tailgate system 400 according to a fourth embodiment of the invention is illustrated. In this embodiment, a single opening position for metering material is provided. Tailgate system 400 includes an L-shaped connecting arm 402 pivotally coupled to frame 24 by a pivot mount 404. In this embodiment, a control unit includes an air cylinder 408 mounted to frame 24 and configured to pull end 406 of connecting arm 402 towards it so as to cause that connecting arm 402 to rotate counterclockwise in FIG. 13. This action places surface 402a in the path of tailgate 16 so that when tailgate opens, surface 402a of connecting arm 402 impacts tailgate 16 and holds tailgate 16 in an opening position for metering material. Pivot mount 404 may be spring biased to an opened position (FIG. 13) so as to ensure that it does not interfere with the tailgate when dumping material. Further, arm 404 may be length adjusted (as indicated by 402' in FIG. 13) so that a user may select more than one opening position for tailgate 16.

Figure 14:
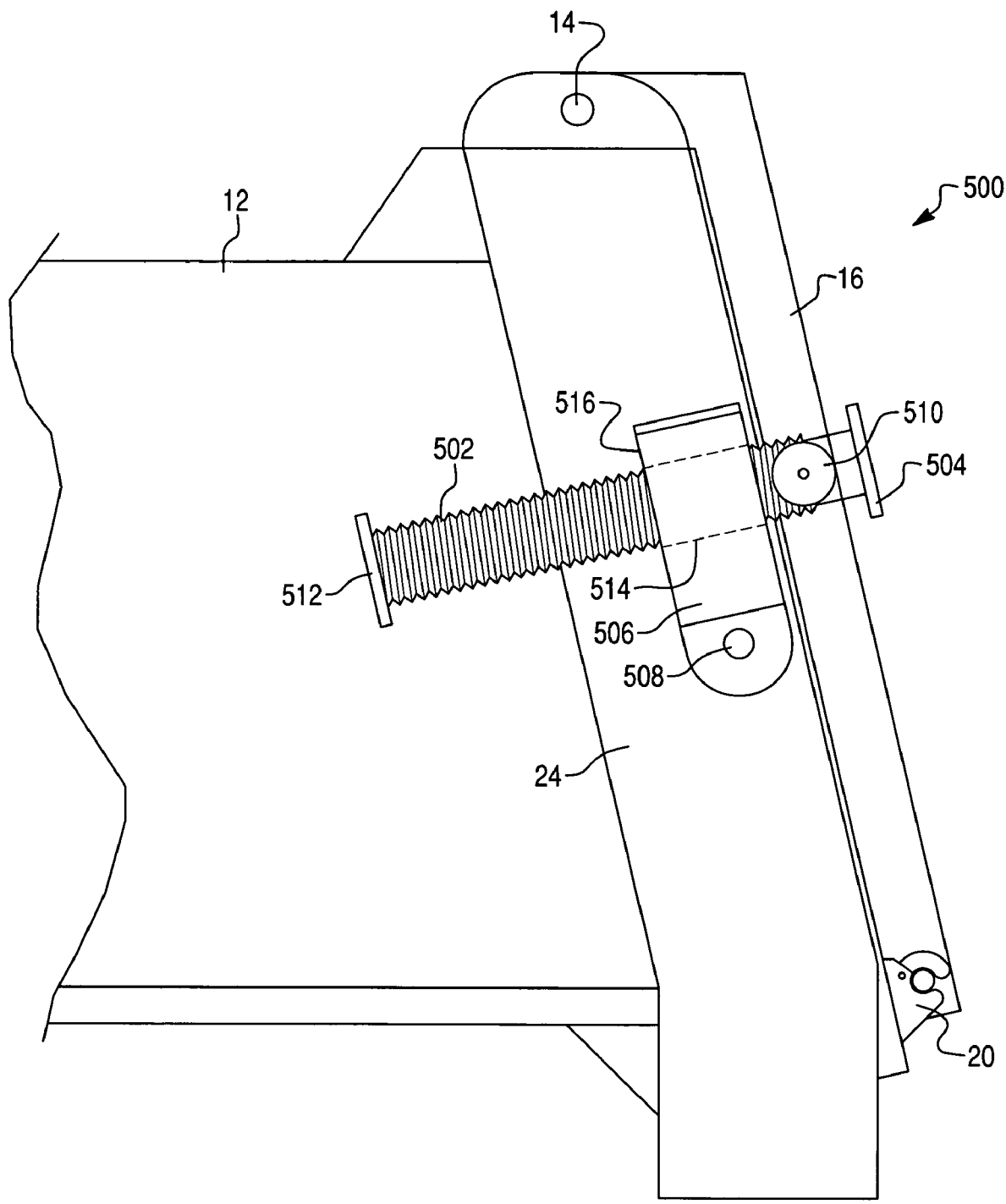
FIG. 14 is a side view of a fifth embodiment of a tailgate system according to the invention.

With reference to FIG. 14, a tailgate system 500 according to a fifth embodiment of the invention is illustrated. In this embodiment, a gear 502 is controlled by a gear device 506. Gear 502 has a flange 512 formed at one end and is attached to tailgate 16 by an attaching device 510, at an opposite end. Attaching device 510 is used to attach or remove gear 502 from tailgate 16. Gear device 506 is pivotally coupled to frame 24 and receives gear 502 for displacement along the axis of gear 502. A flange 504 (located at preset positions from tailgate 16), may be used in place of flange 512. In operation, flange 512 or 504 is positioned at a certain distance from an abutting surface located along the path of gear 502 or the outside surface of tailgate 16, respectively. In operation, gear 502 is decoupled from the actuating mechanism associated with gear device 506, but retained within its chamber 514 for sliding movement therein. When tailgate 16 is opened, gear 502 will displace the predetermined distance until it impacts the abutting surface 516 (flange 512) or the outside surface of tailgate 16 (flange 504). According to the fifth embodiment, gear device 506 may be used to both open and close tailgate 16 but while retaining the ability to catch a free falling tailgate as in the other embodiments.

Figure 15:
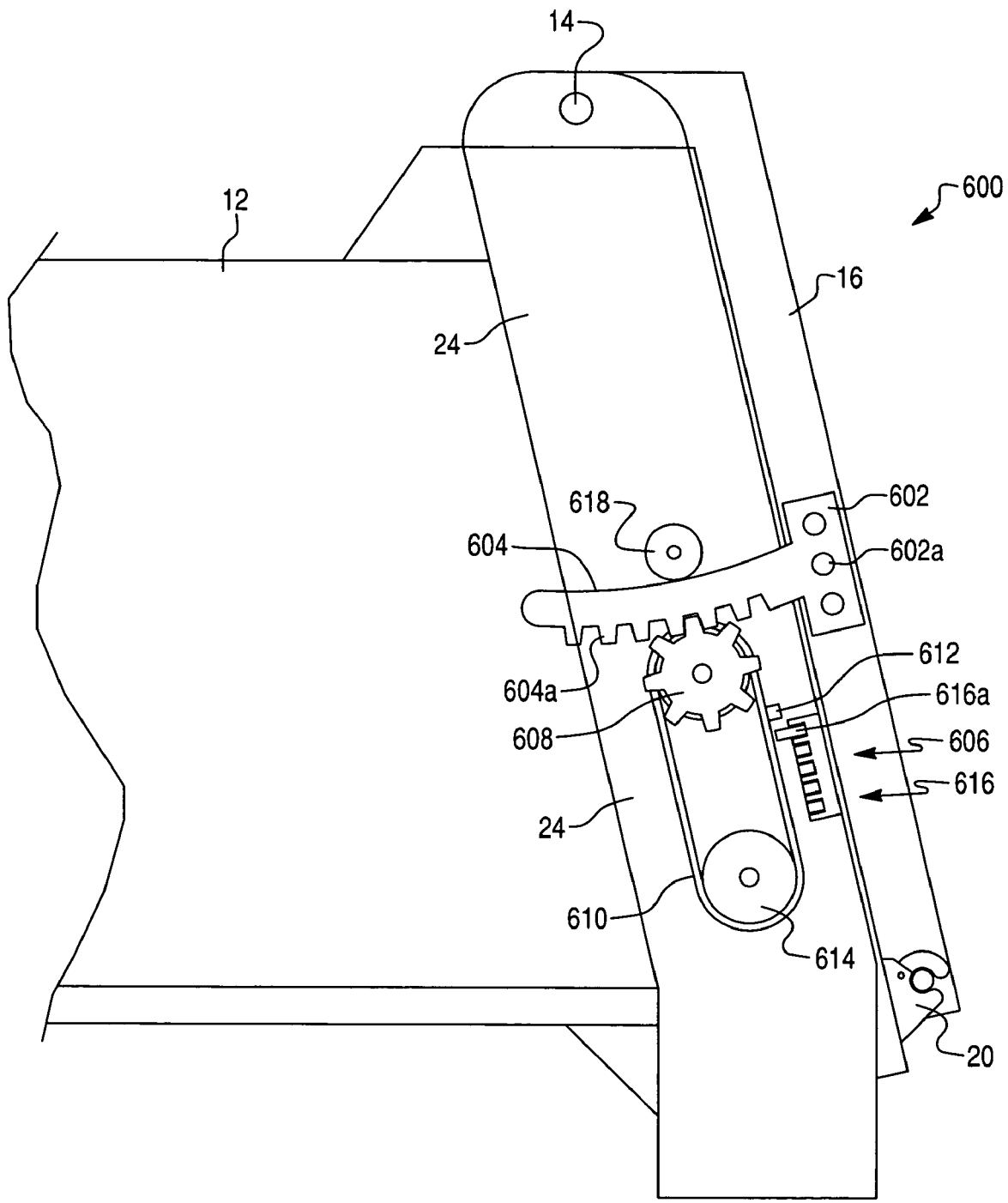
FIG. 15 is a side view of a sixth embodiment of a tailgate system according to the invention.

With reference to FIG. 15, a tailgate system 600 according to a sixth embodiment of the invention is illustrated. In this embodiment, a gear drive is used to set opening positions for tailgate 16. This embodiment, like the others, may be deployed to catch a falling tailgate. Tailgate system 600 includes a connecting arm 602 attached to tailgate 16 by bolts 602a. Connecting arm 602 includes teeth 604a formed along an extension 604. Teeth 604a are meshed with a gear 608 that spins clockwise when tailgate 16 opens. Gear 608 is part of a pulley that includes a lower roller 614 and a chain 610. A block 612 is affixed to chain 610. A secondary roller 618 is mounted to frame 24 to assist with guiding teeth 604a into gear 608 when tailgate 16 rotates into a closed position. A control unit 616 is provided so that a plurality of selectable opening positions are available for tailgate 16. Control unit 616 is mounted to frame 24 and includes a plurality of vertically arranged, movable selectors, e.g., selector 616a, that are adapted for being displaced into the path of block 612. As block 612 moves downward on chain 610 in FIG. 15 when tailgate 16 opens, block 612 impacts selector 616a, thereby halting movement of block 612 and holding tailgate 16 in the opening position corresponding to the position of selector 616a. Gear 608 may also be driven by a hydraulic control so that tailgate 16 can be opened and closed by selectively rotating gear 608 clockwise and counterclockwise, respectively.

It is further appreciated that embodiments of invention allow a user to spread material out evenly, and then change to dumping a pile, without ever needing to get out of the truck to set or un-set the tailgate. As mentioned above, clogs sometimes occur when spreading or dumping material. Moisture levels and clumps in material can cause "plug ups" as the material spreads out. With the conventional chain system, for example, if the tailgate "plugs", the driver has to stop the truck and get out to unplug the gate. In these situations, a driver will need to lower the dump box, in order to be able to reset chains or change to a wider chain setting. According to embodiments of the invention, if the gate begins to plug up, as a driver is spreading material, the driver may simply turns the hand dial 188 to a wider position or positions as needed. There is no need to stop the truck.

It common these days to haul materials of some kind in both directions, i.e., to and from job sites. After arrival at the site, a truck is used to spread select material on the site. The truck is then loaded with waste material and sent back to dump it in a waste pile. In this situation, it is not uncommon to forget to unset chains before dumping. The waste material can then cause a plug in the tailgate. With a spreader chain system, it is known to take at least 20 minutes to dig the waste material free. According to embodiments of the invention, it has been found that if a setting is not deactivated, the dump box raised and the waste material plugs, a driver may simply turn the system selector to the off position (thereby allowing the tailgate to fully open), and raise the hoist lever of the dump box a small degree to free the plugged material.

What I claim is:

1. An apparatus for metered pouring of material from a truck, comprising:
   a. a dump box comprising a wall and a tailgate pivotally connected to the wall;
   b. a first latch connected to the wall and engagable with a lower end of the tailgate; and
   c. a second latch connected to the wall, said second latch including at least a first member and a second member;
   d. an element connected to the tailgate and engagable with the second latch;
   e. a selector device having at least a first and second selection; and
   f. a coupling between the selector device and the second latch such that when the first selection is selected, the first member is engaged and when the second selection is selected, the second member is engaged;
   wherein when the first latch is engaged with the lower end of the tailgate, the tailgate is locked into a closed position; and
   when the first latch is disengaged from the tailgate and the selector device is in the first selection, the tailgate rotates to a first open position where the first member of the second latch engages a member connected to the tailgate and the tailgate is held in a first open position by the first member of the second latch, and when the first latch is disengaged from the tailgate and the selector device is in the second selection, the tailgate rotates to a second open position where the second member of the second latch engages the member connected to the tailgate and the tailgate is held in a second open position by the second member of the second latch, where the lower end of the tailgate moves to a different distance from the wall when the selector device is moved to a different selection.

2. The apparatus according to claim 1, wherein the element connected to the tailgate comprises an arm, where the arm travels over a pathway when the tailgate rotates, and the first member of the second latch is displaced into the pathway when the selector device is in the first selection.

3. The apparatus according to claim 2, wherein the arm is arcuate.

4. The apparatus according to claim 1, wherein the element connected to the tailgate is spaced from the first member of the second latch when the first latch is engaged with the tailgate, and abuts the first member when the tailgate is in the first open position.

5. The apparatus according to claim 1, wherein the coupling comprises at least a first and a second actuator configured to displace, respectively, the at least first and second members.

6. The apparatus according to claim 5, wherein the first and second actuators are air cylinders.

7. The apparatus according to claim 1, further comprising a fluid in communication with the selector device and the first and second latches, whereby a change in selector on the selection device moves the first and second latches by movement of the fluid.

8. The apparatus according to claim 1, wherein the second latch comprises a passageway, wherein the element connected to the tailgate passes through the passageway as the tailgate rotates about a hinge, and the second latch is configured to selectively restrict the passage of the element through the passageway to predefined distances.

9. The apparatus according to claim 8, wherein the first member of the second latch blocks the passageway when the tailgate is held in a first open position.

10. A method for pouring material from a dump box comprising
    a. a wall and a tailgate pivotally connected to the wall;
    b. a first latch connected to the wall and engagable with a lower end of the tailgate; and
    c. a second latch connected to the wall, said second latch including at least a first member and a second member;
    d. an element connected to the tailgate and engagable with the second latch;
    e. a selector device having at least a first and second selection; and
    f. a coupling between the selector device and the second latch such that when the first selection is selected, the first member is engaged and when the second selection is selected, the second member is engaged;
    wherein when the first latch is engaged with the lower end of the tailgate, the tailgate is locked into a closed position; and when the first latch is disengaged from the tailgate and the selector device is in the first selection, the tailgate rotates to a first open position where the first member of the second latch engages a member connected to the tailgate and the tailgate is held in a first open position by the first member of the second latch, and when the first latch is disengaged from the tailgate and the selector device is in the second selection, the tailgate rotates to a second open position where the second member of the second latch engages the member connected to the tailgate and the tailgate is held in a second open position by the second member of the second latch, where the lower end of the tailgate moves to a different distance from the wall when the selector device is moved to a different selection;

the method comprising:

lifting a dump box into an inclined position;

selecting on the selector device one of a plurality of selectable tailgate opening positions, wherein the one opening position selected is suitable for pouring the material from the dump box;

moving a member in the second latch that corresponds to the selected opening position so that the member in the second latch engages the element connected to the tailgate when the tailgate is moved into the selected opening position;

disengaging the first latch from the lower end of the tailgate, letting a lower portion of the tailgate freely pivot away from the wall until it reaches the selected opening position;

engaging the member in the second latch corresponding to the selected opening position with the element connect to the tailgate; and maintaining the tailgate in the selected opening position.

11. The method according to claim 10, wherein when moving the tailgate from one selected opening position to another selected opening position, the selector disengages a member engaging the element connected to the tailgate at the selected opening position and moves a subsequent member to a position such that the subsequent member engages the element connected to the tailgate when the element reaches the another selected opening position.

12. The method according to claim 10, wherein the step of selecting on the selector device the one of a plurality of selectable tailgate opening positions is performed from within a cab of a dumping vehicle.

13. The method according to claim 12, wherein the dumping vehicle is a dump truck.

14. The method according to claim 10, wherein the lifting of a dump box comprises actuating a hydraulic cylinder by a control device located within a cab.

15. The method according to claim 10, wherein the step of moving a member in the second latch is achieved by displacing a piston arm of an air cylinder and thereby displacing the member in the second latch.

16. An apparatus for controlling the movement of a tailgate, the tailgate being pivotally mounted to a dump box at an upper end thereof, comprising:
 a. a first latch connected to a wall and engagable with a lower end of the tailgate; and
 b. a second latch connected to the wall, said second latch including at least a first member and a second member;
 c. an element connected to the tailgate and engagable with the second latch;
 d. a selector device having at least a first and second selection; and
 e. a coupling between the selector device and the second latch such that when the first selection is selected, the first member is engaged and when the second selection is selected, the second member is engaged; wherein said coupling comprises a control device adapted to move a member between a first and second position, the second position corresponding to at least a portion of the member adapted to move by the control device being within a passage;

wherein when the first latch is engaged with the lower end of the tailgate, the tailgate is locked into a closed position; and when the first latch is disengaged from the tailgate and the selector device is in the first selection, the tailgate rotates to a first open position where the first member of the second latch engages a member connected to the tailgate and the tailgate is held in a first open position by the first member of the second latch, and when the first latch is disengaged from the tailgate and the selector device is in the second selection, the tailgate rotates to a second open position where the second member of the second latch engages the member connected to the tailgate and the tailgate is held in a second open position by the second member of the second latch, where the lower end of the tailgate moves to a different distance from the wall when the selector device is moved to a different selection;

wherein when the member is in the first position, the tailgate can freely rotate within a first angular range and when the member is in the second position, the tailgate can freely rotate within a second angular range, the first angular range being greater than the second angular range.

17. The apparatus according to claim 16, wherein the passage is defined by at least one of a channel of the wall, a channel formed by a housing mounted to the wall, and an opening in the wall.

18. The apparatus according to claim 16, wherein the passage is defined by an arcuate channel.

19. The apparatus according to claim 16, further comprising a second portion which includes an actuator, coupled to the first member and configured to place the first member into either of a first or second position.

20. The apparatus according to claim 16, wherein the second portion includes a first and second member, the second member of the second portion being configurable between a first and second position, and the second position of the second portion second member corresponding to the second member of the second portion being disposed within the passage, wherein when the second member of the second portion is in the second position, the tailgate can freely rotate within a third angular range.

21. The apparatus according to claim 20, wherein the passage has a length and the first and second members of the second portion are spaced from each other along the length, and wherein a space between the first and second members of the second portion is proportional to a difference in magnitude between the second and third angular ranges.

22. The apparatus according to claim 21, wherein the passage is one of curved and straight.

23. A method for metered pouring of material from a dump truck, having a cab and a dump box comprising
 a. a wall and a tailgate pivotally connected to the wall;
 b. a first latch connected to the wall and engagable with a lower end of the tailgate; and
 c. a second latch connected to the wall, said second latch including at least a first member and a second member;
 d. an element connected to the tailgate and engagable with the second latch;

e. a selector device having at least a first and second selection; and f. a coupling between the selector device and the second latch such that when the first selection is selected, the first member is engaged and when the second selection is selected, the second member is engaged;

wherein when the first latch is engaged with the lower end of the tailgate, the tailgate is locked into a closed position; and when the first latch is disengaged from the tailgate and the selector device is in the first selection, the tailgate rotates to a first open position where the first member of the second latch engages a member connected to the tailgate and the tailgate is held in a first open position by the first member of the second latch, and when the first latch is disengaged from the tailgate and the selector device is in the second selection, the tailgate rotates to a second open position where the second member of the second latch engages the member connected to the tailgate and the tailgate is held in a second open position by the second member of the second latch, where the lower end of the tailgate moves to a different distance from the wall when the selector device is moved to a different selection;

the method comprising:

lifting a dump box into an inclined position;

selecting on the selector device one of a plurality of selectable tailgate opening positions, wherein the one opening position selected is suitable for pouring the material from the dump box; wherein the selector device is located with a cab;

moving a member in the second latch that corresponds to the selected opening position so that the member in the second latch engages the element connected to the tailgate when the tailgate is moved into the selected opening position;

disengaging the first latch from the lower end of the tailgate, letting the lower portion of the tailgate freely pivot away from the wall until it reaches the selected opening position;

engaging the member in the second latch corresponding to the selected opening position with the element connect to the tailgate; and maintaining the tailgate in the selected opening position.

24. The method according to claim 23, wherein disengaging the first latch from the lower end of the tailgate occurs from within the cab.

25. The method according to claim 23, wherein moving a member in the second latch comprises actuating an air cylinder that is operatively coupled to the member in the second latch.

26. The method according to claim 25, further comprising moving a second member of the second latch into a path of the element connected to the tailgate by actuating the air cylinder such that the element connected to the tailgate impacts the second member of the second latch and prevents continued movement of the tailgate.

27. The method according to claim 23, wherein the tailgate falls along a path and further including an actuating step which includes remotely displacing a stopping member into the path.

28. The apparatus of claim 1, wherein the coupling between the selector device and the second latch comprises
an actuator powered by pressurized fluid, wherein the fluid powered actuator selectively positions members in the second latch between a first position for engagement with the tailgate at a first tailgate opening position and a second position for engagement with the tailgate at a second tailgate opening position.

29. The apparatus according to claim 28, wherein the first and second latch positions are configured for engaging the element connected to the tailgate and moving the tailgate into different positions as the tailgate falls from a closed tailgate position.

30. The apparatus according to claim 29, wherein the fluid powered actuator comprises at least a first air cylinder and a second air cylinder adapted for selectively positioning the respective at least first and second latch members for engagement with the element connected to the tailgate as the tailgate rotates about the dump box.

31. The apparatus of claim 28, wherein the fluid is air.

* * * * *